United States Patent [19]
Jureit et al.

[11] 3,910,142
[45] *Oct. 7, 1975

[54] AUTOMATED SAW

[75] Inventors: John C. Jureit, Coral Gables, Fla.;
Lawrence A. Hoffman, Potomac, Md.

[73] Assignee: Automated Building Components, Inc., Miami, Fla.

[ * ] Notice: The portion of the term of this patent subsequent to Oct. 5, 1988, has been disclaimed.

[22] Filed: Nov. 28, 1973

[21] Appl. No.: 419,819

Related U.S. Application Data

[60] Continuation of Ser. No. 113,012, Feb. 5, 1971, which is a division of Ser. No. 549,624, May 17, 1966, Pat. No. 3,610,299.

[52] U.S. Cl. .................. 83/71; 83/268; 83/364; 83/471.3; 83/485
[51] Int. Cl. ..................... B27b 5/20; B26d 5/30
[58] Field of Search ....... 83/71, 268, 360, 364, 361, 83/467, 468, 471.3, 471.2, 485

[56] References Cited
UNITED STATES PATENTS

| | | | |
|---|---|---|---|
| 3,141,367 | 7/1964 | Keener | 83/268 X |
| 3,176,556 | 4/1965 | Roberts et al. | 83/71 |
| 3,329,181 | 7/1967 | Buss et al. | 83/364 |
| 3,610,299 | 10/1971 | Jureit et al. | 83/71 |

*Primary Examiner*—Donald R. Schran
*Attorney, Agent, or Firm*—LeBlanc & Shur

[57] ABSTRACT

The automated saw has a saw table and saw superposed over the table for movement there across at selected angles. Board-length-positioning devices are spaced along the saw table. The variable angle saw and the variable-length-positioning devices are controlled by an input including predetermined numerical information. The saw is set up that single and double cuts can be made at opposite ends of the boards with the board length and saw angle positioning devices being automatically preset by the numerical information input.

13 Claims, 19 Drawing Figures

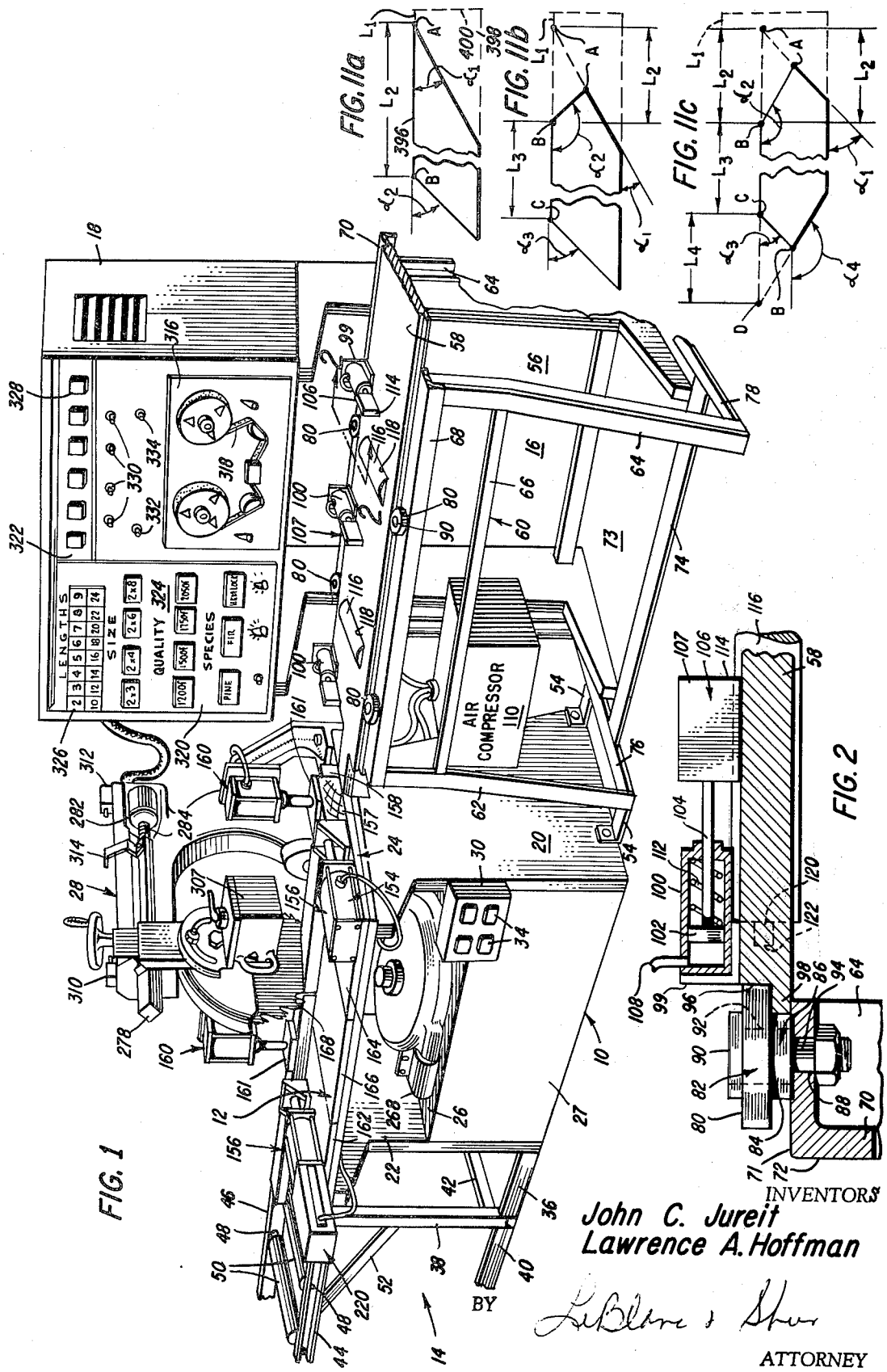

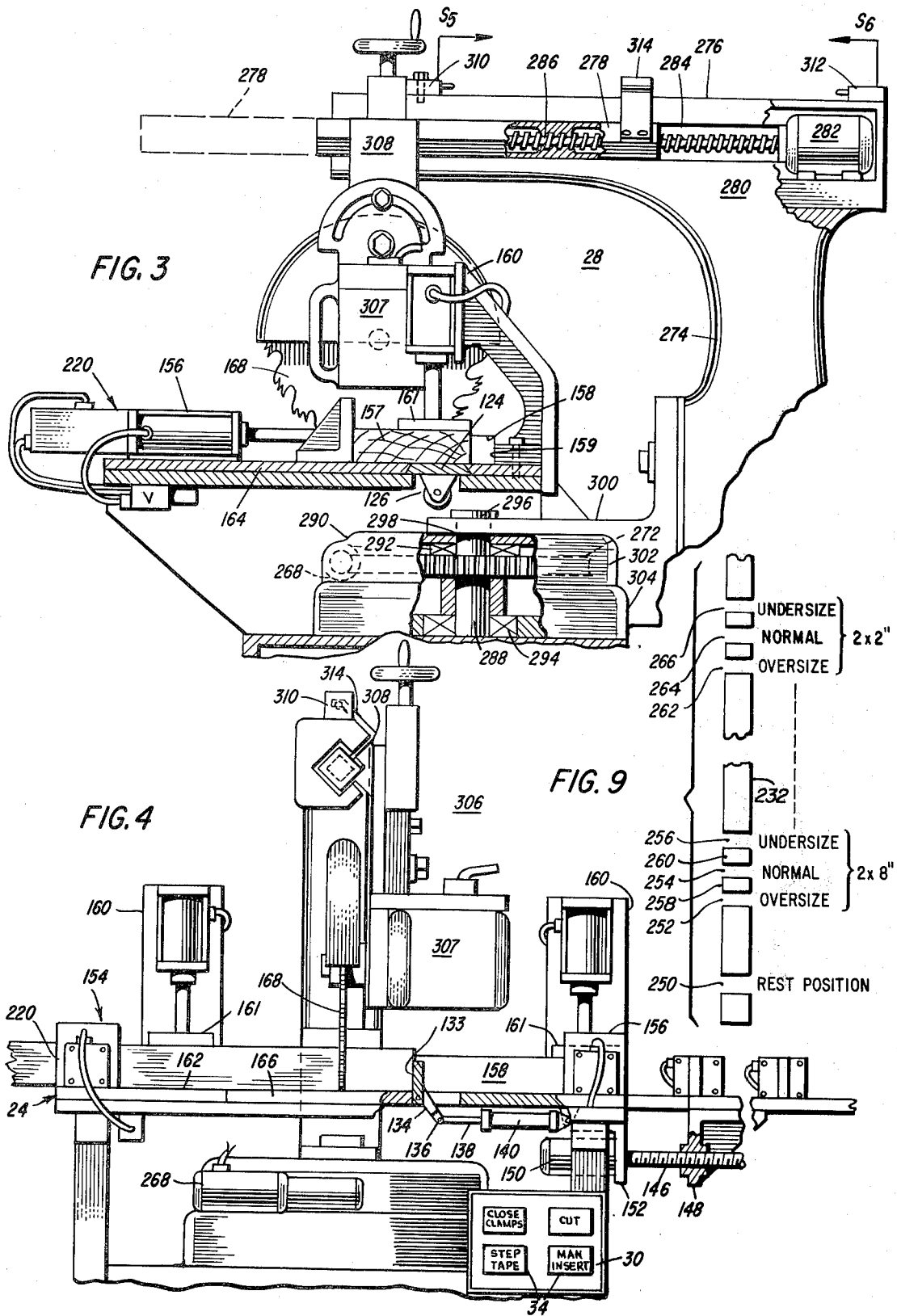

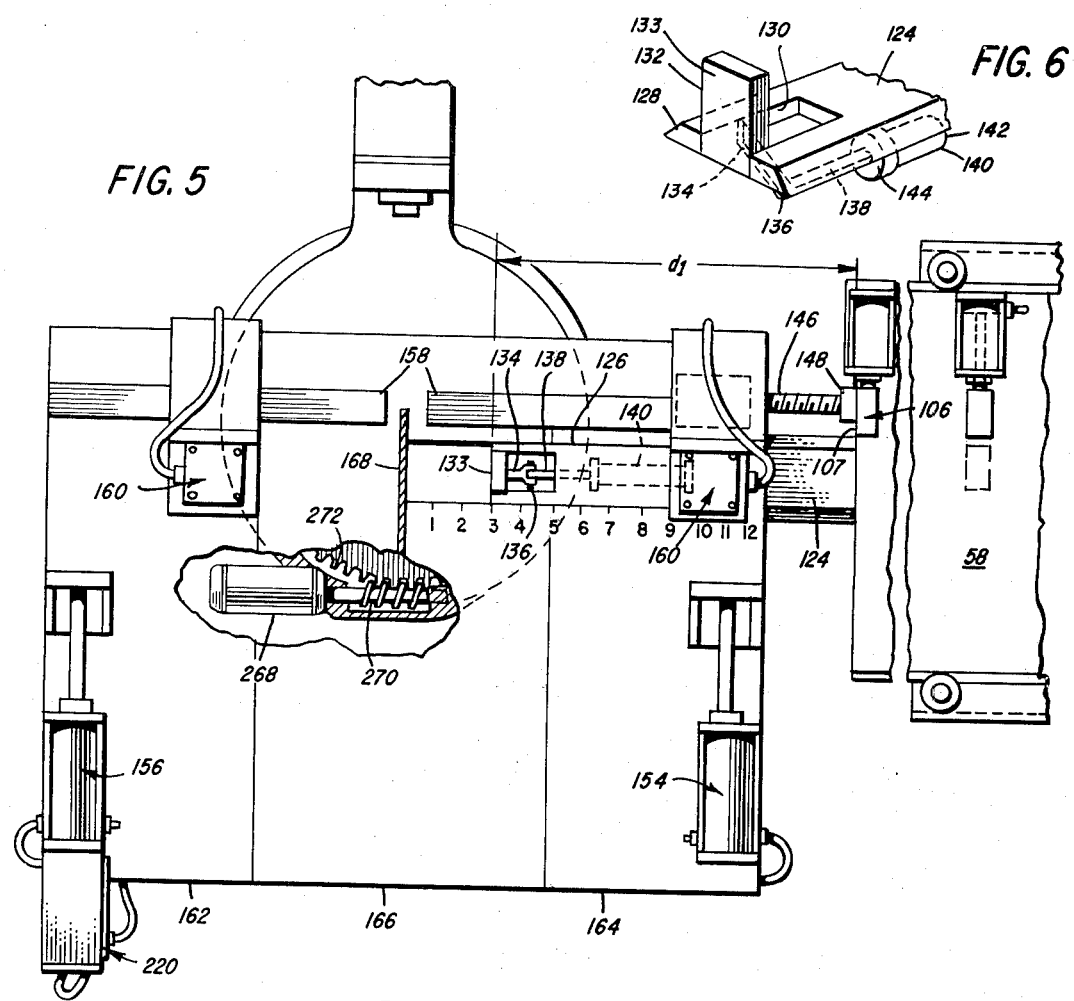
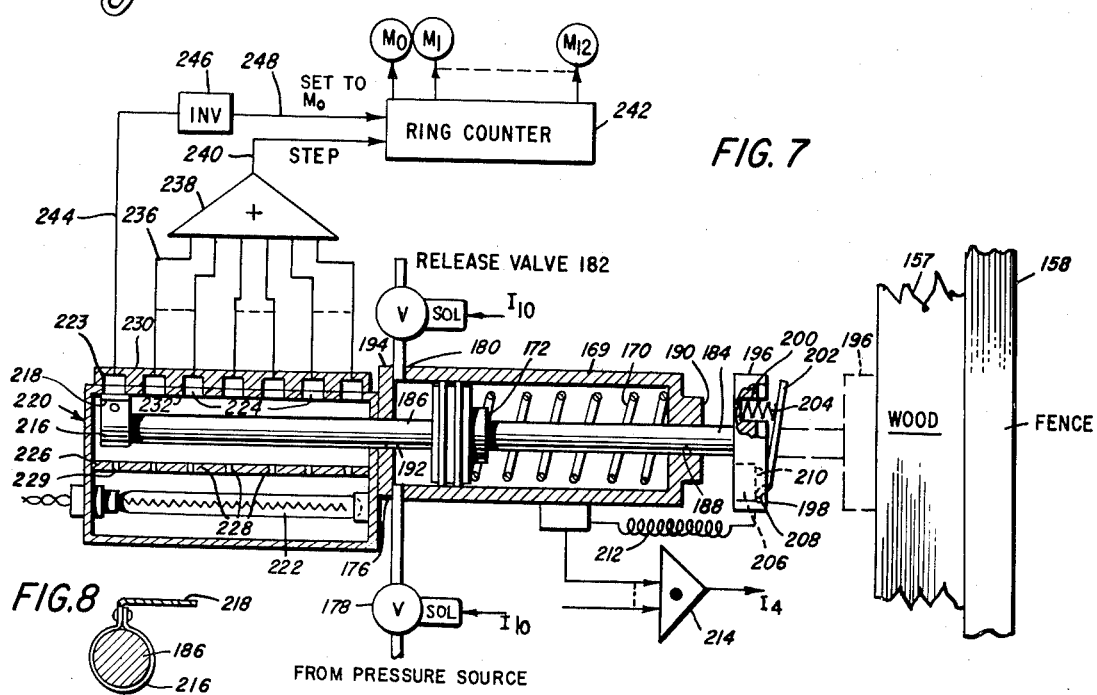

AUTOMATED SAW

This application is a continuation of Application Ser. No. 113,012 filed Feb. 5, 1971 and which Application Ser. No. 113,012 is a division of Application Ser. No. 549,624 filed May 17, 1966, now U.S. Pat. No. 3,610,299 dated Oct. 9, 1971.

This invention relates to an apparatus for manufacturing structural wooden devices, and more particularly to apparatus for cutting chords or segments of structural wooden devices such as roof trusses and the like.

With the advent of the connector plate shown in Jureit, U.S. Pat. No. 2,877,520, it became possible to manufacture structural wooden devices such as roof trusses without the necessity of manual nailing, bolting or gluing. These connectors comprise steel plates having slender, elongated nail-like teeth struck therefrom in three or more rows so as to extend substantially perpendicular to the plate. Structural wooden butt joints employing such connectors may be formed by simply sandwiching the two butted wooden members between pairs of the Jureit plates and simultaneously pressing the teeth of both plates into the lumber to form a completed joint. The operation is rapid, low in cost, and provides a built-in quality, in that there is no necessity to rely upon the proper number of nails, bolts or other fasteners being manually affixed in the formation of the joints. The widespread adoption of such joints has resulted in concurrent improvements in other aspects of the truss fabrication procedure.

For example, because all roof trusses of a particular configuration are comprised of component parts of the same shape, it has proved convenient to prepare the components for assembly in a systemstized or production line manner, even further reducing the fabrication time and cost thereof. If a particular truss is comprised of four distinctly shaped chords or boards and 100 trusses are to be produced, 100 boards of the first shape are cut, then 100 boards of the second shape, etc. All of the precut components are then appropriately arranged, and assembled by means of so called "truss presses" such as shown in Jureit U.S. Pat. No. 3,195,449. Typically, the cutting process is carried out by means of conventional type table saws, adjustable radial arm saws, etc. This process has proven to be quite successful.

Further, it has been found advantageous to systematize to a large degree, other phases of the design and manufacturing process, both in the interest of quality and economy. In particular, computing equipment has been utilized to actually design trusses upon specification of the overall configurations thereof, starting materials, etc. Thus, upon specification by the architect of the general shape, etc., of the desired truss, the computer can very rapidly calculate the appropriate lengths and angles of the component boards, and produce seale drawings thereof, appropriately labeled as to dimensions, type of stock material, etc. These drawings are directly provided to the sawyers and assemblers without the cost and delay of manual design.

As the use of roof trusses employing Juriet-type connector plates became more widespread, the demand grew for the production of widely varying types of trusses which would permit architects increased freedom of roof design. Use of such trusses permits the erection of low-cost homes with varying roof lines, so as to avoid the growth of communities wherein all houses are identical. Due to the wide variety fo possible truss designs and board shapes, there results a situation in which a substantially unlimited number of board length and cutting angles may be specified by the architect. As a result, the various cutting and fabrication techniques referred to above, lose their systematized or production line nature since each segment of the truss may well be of a different length, etc., and few successive trusses will require the same segments. Such board-to-board uniqueness greatly increases the amount of time necessary to assemble a given roof truss since it is generally not possible to mass produce the segments before assembly.

According to the present invention, it has been found to be possible to automate the work of the sawyer to such a great degree, as to substantially overcome the problems of uniqueness of the segments of special trusses. Briefly, according to one embodiment of the invention, there is provided a fabrication machine including a single numerically controlled variable angle saw and a numerically controlled variable positioning device, whereby the proper angle and length of board can be automatically established during the time that the sawyer is placing the board on the machine. The device may be controlled by punched or magnetic tape or by punched cards carrying information generated by the above-described computing machines in response to the specification of the gross characteristics of the truss. The information necessary to fabricate all of the segments of a single truss may be provided serially on the tape or on a deck of cards whereby the operator need only insert the same into a tape or card reader and is automatically provided with all of the information necessary to rapidly fabricate the truss.

Such information includes all of the dimensions of the starting material to be used, as well as indications of when to insert, remove, or advance each board in order to cut truss members having one or two angles at each end. All of the indications are appropriately displayed for use by the operator. Since a single saw is used in the above-described embodiment, after one end of the board is cut, it is advanced and reinserted in the machine. During the time that the board is being advanced, the appropriate saw settings are automatically recorded, whereby upon reinsertion of the board, the second cut may be automatically made.

In addition, to provide great flexibility the machine can cut boards having one or two cuts at each end with no adjustment or modification between cuts.

As may be understood, considerable variation may be expected in the lengths of both the starting material and the completed segments. For example, the required stock length may vary from 2 to 24 or more feet. Accordingly, it is a feature of the invention that there is provided a two-step, numerically controlled positioning arrangement in which the cutting position is set concurrently by coarse and fine adjustments.

It is also a feature of the invention that means are provided to adjust the angular position of the saw blade whereby such blade always crosses the cutting surface in approximately the same place irrespective of the angle setting, and where the lumber is moved in one direction only to make each subsequent cut. This simplifies the construction of the machine as well as the design of the components of the truss.

A further feature of the present invention relates to design difficulties that exist due to variation of the dimensions of the stock material, A "2×4" for example may vary somewhat about its nominal width of 3⅝ inches, perhaps as much as 1/16 inch. As a result, if the length and angles of the segments are specified for boards of nominal dimensions and the particular boards used are either over or under the nominal size, it will be found that the truss will not "fit together" properly.

Thus, the possibility of such size variations must be taken into account in the design of the truss components, and accordingly it has been found to be desirable to specify three dimensions and three angles for each segment, the appropriate ones of which to be selected by the sawyer after measurement of the width of the stock material to be used.

According to this invention, means are provided for automatically selecting the appropriate set of dimensions and angles to be used in accordance with the board width. In fact, it has been found that it is possible to entirely automate the selection process even to the extent of automatically measuring the width of the boards.

As may be understood, use of the concepts of the present invention greatly facilitates the fabrication of special roof trusses, since the extreme accuracy of angle and length settings needed for proper fit is accomplished rapidly and automatically without the expenditure of operator time. In addition, if desired, the fabrication line is readily adaptable to the manual setting of the dimensions and angles whereby the equipment may be utilized in the mass production techniques for uniformly shaped trusses described above.

In an alternative embodiment of the invention, there may be provided a variable length fabrication line having one fixed and one longitudinally movable saw, the separation and angular settings of which saws are determined by numerical information provided on punched cards or tape. Again, all of the information necessary may be provided on the tape and registered on a display panel in view of the sawyer. A two-saw embodiment has the advantage that less time is required to cut each board.

Accordingly, it is a primary object of this invention to provide improved apparatus for fabricating wooden members of variable specified shapes and dimensions.

It is also an object of this invention, to provide a fabrication machine permitting the rapid and low cost manufacture of component members for wooden roof trusses of variable special shape.

It is also an object of this invention, to provide an improved fabrication line whereby each of the segments of a roof truss may be rapidly and accurately cut to specified sizes and shapes.

It is an additional object of this invention to provide an automated fabrication machine including one or more angularly adjustable saws and having provision for accurately establishing the final length of the cut board.

It is a further object of this invention to provide a fabrication machine as described above which automatically compensates for variations above and below the nominal width of the stock material to be fabricated.

It is a further object of this invention to provide a saw machine as described above including a single saw and a variably positionable measuring means for adjusting the cutting length.

It is also an object of this invention to provide a fabrication machine as described above including means to adjust the length to which the board is cut having separate coarse and fine adjustments.

It is an additional object of this invention to provide a fabrication machine as described above where each saw blade crosses the cutting area at the same point, independent of its angular adjustment.

It is also an object of this invention to provide a machine as described above in which the lumber to be cut moves only in one direction throughout the cutting process.

The exact nature of this invention, as well as other objects and advantages thereof will become clear from the following specification, and the annexed drawings, in which:

FIG. 1 is an overall perspective view showing the details of one embodiment according to the present invention;

FIG. 2 is a sectional view taken along line 2—2 in FIG. 1 showing the manner of construction of a portion thereof;

FIG. 3 is a side elevation, partially in section, and partially cut away, showing the construction of the saw according to the present invention;

FIG. 4 is a front elevation, also partially in section, and partially cut away, of the mechanisms shown in FIGS. 1 and 3;

FIG. 5 is a partially cut away plan view of the apparatus shown in FIGS. 1, 3 and 4 showing the manner in which the saw blade angle and the length of the segment to be cut are adjusted;

FIG. 6 is a perspective view of one of the variable lumber stops used to establish the length of the segment to be cut;

FIG. 7 is a schematic view of one of the combined lumber clamp and board width sensors used to identify an oversized, normal or undersize piece of lumber;

FIG. 8 is an end view of a portion of FIG. 7 showing the details of the construction thereof;

FIG. 9 is a schematic view of a further portion of FIG. 7 showing the manner in which an oversize, normal, or undersize piece of lumber is identified;

FIGS. 11a through 11c show illustrative configurations which may be assumed by a truss segment and which may be conveniently accommodated by the apparatus of the present invention.

Figure 10:
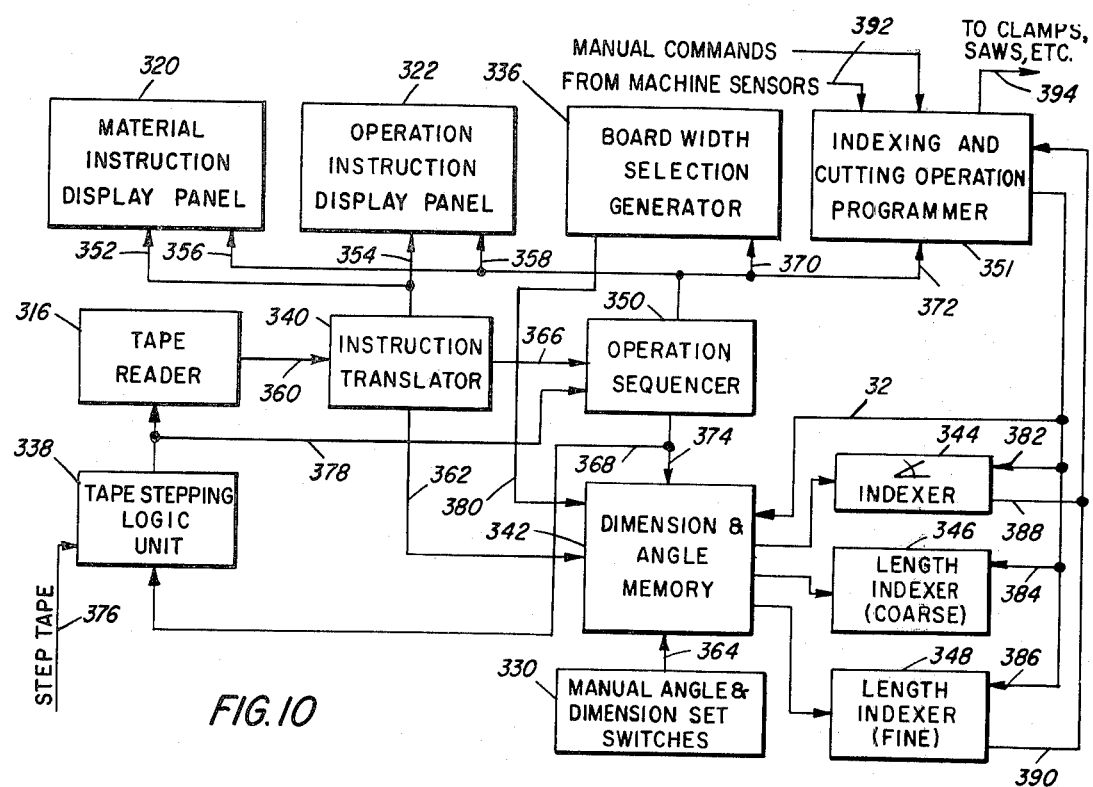
FIG. 10 is a generalized overall block diagram of the numerical control system used in the present invention.

Referring first to FIG. 1, there is shown an overall perspective view of a single saw embodiment of the fabrication machine according to this invention. The apparatus generally denoted at 10 comprises a central saw table 12, a conveyor table 14, and a measuring table 16 arranged longitudinally to provide an extended working surface upon which the lumber is cut. The apparatus also includes an electronic console 18 positioned within convenient reach and view of the operator.

Saw table 12 comprises a pair of vertical side members 2 and 22 and a top member 24. Below top member 24 is positioned a horizontal shelf 26 having a front facing 27 which provides a support for pivotally mounting a radial arm saw 28 in a manner explained below. Also disposed below top member 24 within convenient reach of the operator is a suitable dust-proof receptacle 30 having a plurality of push buttom electrical switches 34 projecting therefrom. In the present embodiment, 4 such switches are provided, and serve the functions of initiating the various manually-controlled operations included within the sequence of steps by which a truss is cut.

Conveyor table 14, a portion of which is shown, is rigidly attached to side member 22 by a pair of horizontal rails such as 36 extending outwardly at the bottom of saw table 10. Conveyor 14 incljdes a number of legs 38 and extended members 40 and 42 forming the bottom thereof. Mounted upon legs 38 are a pair of horizontal rails 44 and 46 having a series of aligned aperatures 48 for rotably receiving a plurality of rollers 50 on which the lumber may be conveniently transported. Table 14 may also include a number of diagonal bracing members such as 52 between rails 44 or 46 and nearby legs 33. As may be understood, conveyor portion 14 is made of sufficient length to support the maximum size lumber to be cut.

Measuring table 16 is positioned at the opposite end of saw table 10 and may be rigidly bolted thereto by means of a pair of brackets 54. Table 16 serves the dual purpose of supporting the lumber while it is being cut, as well as accurately and rapidly establishing the distances between cuts. Table 16 is comprised of a supporting frame 56 and a horizontal stop carriage 58 slidably mounted thereon as described below. Frame 56 comprises of a pair of identical front and rear frames 60, each having a pair of legs 62 and 64 and a crosspiece 66 therebetween. Connected between legs 62 and 64 at the upper ends of both front and rear frames 60 are a pair of right angle beams 68 and 70, respectively, having horizontal surfaces 71 and vertical surfaces 72. Front and rear frames 60 are rigidly connected by a horizontal H-frame 73 including a longitudinal member 74 and a pair of transverse members 76 and 78.

Each of beams 68 and 70 carries a plurality of upright rollers 80 to support and guide stop carriage 58. Each roller 80 comprises a cylindrical retainer disc 82 spaced above horizontal surface 71 of the right angle beam 70 by a cylindrical roller 84 (see FIG. 2). Disc 82 and collar 84 are rotatably mounted on a pin 86 which extends through an aperture 88 in beam 70. Pin 86 includes a head portion 90 and an upper shank portion 92, having a greater diameter than aperture 88, whereby the pin rests on surface 71. The length of upper shank 92 is somewhat greater than that of collar 84, so that both disc 82 and collar 84 are freetto rotate. Pin 86 also includes a threaded lower shank portion 94 by which it may be bolted to beam 70.

As seen in FIG. 2, stop carriage 58 includes a stepped edge 96 and a shoulder 98 adapted to rest on surface 71 of beam 70. Shoulder 98 is of the same height as sleeve 84 and the transverse distance between the rows of rollers 80 is sufficient to assure freedom of motion for carriage 58 as it travels along table 16.

Mounted along the rear edge of carriage 58 are a plurality of supporting brackets 99, each of which supports a pneumatic cylinder 100 positioned at one-foot intervals along the carriage. Each of cylinders 100 is fitted with a piston 102 which extends and retracts a shaft 104. Attached at the end of each shaft 104 is a plate 106 the side 107 of which serves as a stop against which the piece of lumber to be cut may be positioned. Pistons 102 are operated by compressed air delivered over an airline 108 from a suitable compressor 110 mounted under table 16, or below shelf 26 on saw table 12. Each of lines 108 is connected by a solenoid operated valve (not shown) to the common pressure source 110. The pressure drives piston 102 against a compressable coil spring 112 mounted on shaft 104 within cylinder 100. When the associated solenoid is released, the pressure against piston 102 is relieved, whereby spring 112 returns piston 102 to its rest position and retracts stop 106. The length of shaft 104 and stop 106 are preferably designed so that when piston 102 is in its rest position the front edge 114 of stop 106 provides a convenient support and guide against which the lumber to be cut may rest.

As explained below, carriage 58 will generally be adjusted while lumber is resting thereon. Accordingly, means are provided in the form of one or more rollers 116, similar to rollers 50 mounted in transverse slots 118 in carriage 58. Rollers 116 are freely mounted in any convenient manner as by a pair of axial pins such as 120 adapted to be received in a pair of aligned recesses such as 122 shown in FIG. 2.

With particular reference to FIGS. 4, 5 and 6 stop carriage 58 is seen to include an elongated tongue portion 124 which is adapted to fit into a complementary slot 126 in the side of saw table top member 24. The extreme end 128 of tongue 124, i.e. the left hand end includes a further slot 130 within which is positioned a lumber stop which serves the same purpose as previously described stops 106 shown in FIGS. 1 and 2.

In order to facilitate construction and use, stop 132 is mounted at the end 128 of tongue 124 with the front surface 133 adapted to engage the lumber and is arranged to pivot outwardly from the slot under the influence of a lever 134, angularly depending from the underside thereof. Lever 134 includes a forked end 136 within which is pivotally mounted an elongated shaft 138. A pneumatic cylinder 140 is mounted on the underside of tongue end 128, and is adapted to receive the other end of shaft 133, and to reciprocate the shaft by means of a piston (not shown) in the manner described in connection with shaft 104 (see FIG. 2). As may be understood, a spring, similar to spring 112 in FIG. 2 is positioned with cylinder 140 between the piston and the rear wall 142 of the cylinder, and the compressed air is supplied at the left end 144 thereof, so that in its rest position, shaft 138 is extended and lumber stop 132 is retracted, surface 133 being flush with the top of tongue 124.

As previously mentioned, each of stops 107 is precisely located at one foot intervals along stop carriage 58. In like fashion, stop 132 is also located a distance $d_1 - 1$ foot from the nearest one of stops 106. Thus, assuming carriage 58 to be fixed, selective operation of one of stops 106 or stop 132 will provide reference lengths at one foot intervals at which lumber may be cut. However, to provide for accurate guides at intervals between each one-foot stop, carriage 58 is adapted to move longitudinally between rollers 80 under the control of a lead screw 146 and a threaded follower 148 (see FIGS. 4 and 5). As shown, screw 146 is connected to a motor 150, which is preferably a step motor of conventional design and is secured to the underside of table top 24 by a bracket 152. Similarly, follower 148 depends downwardly from the under surface of carriage 58, in accurate alignment with screw 146.

As described below, step motor 150 is automatically operated to adjust the position of the stop carriage 58 with an accuracy of 1/32 inch over a one foot interval. Thus, there is provided an accurate cutting guide by first lifting a stop 106 or 132 to afford a coarse adjustment and the moving the entire stop carriage to provide the fine adjustment.

Referring still to FIGS. 1 and 3–5, there is shown the construction of saw table 12 and the automatic radial arm saw 28. Resting on table surface 24 is a supporting plate which may be comprised of a pair of spaced apart sections 162 and 164 having a wooden plank 166 inserted therebetween which serves a protective cutting surface for the saw blade 168.

Plate sections 162 and 164 carry a number of pneumatically operated clamps such as that denoted at 154, and a single combination clamp and board-width sensor 156 (on plate section 162) which serve to rigidly support the lumber 157 to cut against an elongated wooden member 158 which serves as a guide fence. Guide fence 158 is rigidly supported against the front sides 159 of a pair of upright brackets 160, bolted or otherwise secured to both table top 24 and supporting plate 152. On each of brackets 160 is mounted a vertical hold-down clamp such as 161 to further support the lumber 157 while it is being cut.

The construction of horizontal clamps 154, combined clamp and board-width sensor 156 and vertical hold-down clamps 161 is shown in FIG. 7. The clamp comprises a pneumatic cylinder 169 having therein a compressible spring 170 and a piston 172. The rear portion 194 of cylinder 169 includes a first port 176 connected through a solenoid operated valve 178 to a source of compressed air, such as compressor 110 shown in FIG. 1. The rear portion 194 of the cylinder also includes a second port 180 by which the cylinder may be externally vented through a second solenoid operated valve 182. The solenoid for valve 178 is adapted to open the valve in response to the actuation thereof while the solenoid for valve 182 closes the valve upon actuation. Thus, a single signal operates both solenoids, and the presence or absence of the signal automatically initiates the operation of piston 172. A pair of shafts 184 and 186 are disposed on opposite sides of piston 172 and are adapted to be driven thereby.

When the signal is present, air is introduced into cylinder 169 and piston 172 is forced against spring 170. The spring is compressed, and shaft 184 advances through an aperture 188 in front wall 190 of cylinder 169, while shaft 186 recedes through a similar opening 192 in rear cylinder wall 194. When the electrical signal is removed, the cylinder is vented and spring 170 forces piston 172 to return to its rest position.

Mounted at the forward end of shaft 184 is a clamping block 196 which is adapted to bear against the lumber 174 to keep it rigidly in place against guide fence 158. Clamping block 196 is constructed so as to furnish an electrical indication when it reaches the maximum extension permitted by the particular piece of lumber 157 so that further operations of the machine are provided until the lumber is fully locked in place against fence 158.

To this end, the front face 198 of block 196 includes a cavity 200 in which is pivotally mounted a hinged plate 202 which serves as a sensor. Plate 202 is biased outwardly from block face 198 by a compressable spring 204 which is chosen to apply a substantial outward force against the plate. The force is overcome only when the clamp has extended a sufficient distance to fully lock the lumber 147 in place between block 196 and fence 158 as shown in outline in FIG. 7.

When plate 202 is forced into cavity 200, a microswitch 206 mounted therein adjacent the pivot point 208 of plate 202 is closed by mechanical contact of plate 202 against microswitch actuator 210. Upon closure of switch 206, an electrical signal is provided over a coiled conductor 212 (which has sufficient extended length to conveniently accommodate the maximum required travel of shaft 184) to a coincidence gate 214. Similar signals are provided from all of the other clamps whereby, until all are fully closed, no output is present from gate 214. The gate output may be used as an electrical inerlocking signal by the remainder of the system as described below in order to condition subsequent steps in the cutting program only after all of the clamps are completely closed.

As shown in FIGS. 7 and 8, secured to the end of rearwardly extending sahft 186 is a collar 216 having thereon an upwardly bent flange 218. Shaft 186 and collar 216 are positioned within a dust-proof enclosure 220 which houses a lamp 222, a first photodetector 223, and a further plurality of photocells 224. Shaft 210 is separated from lamp 222 by an extended plate 226 having a plurality of small apertures 228, each aligned with one of photocells 224. A further aperture 229 is aligned with photodetector 223. Each of apertures 228 and 229 are made quite small, in order to minimize the amount of stray light which might pass through a given aperture to one of the nonaligned photocells.

Photocells 223 and 2324 are enclosed in a small light-proof housing 230 attached to the outer wall 232 of dust proof enclosure 220, which comprises a plate having apertures aligned with photocells and 229 to further minimize the effects of stray light.

As may be understood, the force of the compressed air on piston 172 will cause the movement of shaft 186 so that flange 218 successively blocks and unblocks one or more of photocells 224, the number of such cells blocked being determined by the thickness of the piece of lumber 147. As the light to successive cells 224 is blocked, signals are generated and pass along leads 236 to a gating circuit 238, which is adapted to provide a signal at output 240 each time a photocell is blocked. Output 240 is connected to the stepping input of a 13 position ring counter 342, having states denoted as $M_0$ through $M_{12}$, whereby each time a photocell is blocked, ring counter 242 is advanced to the next state.

Photocell 223 and aperture 229 are so positioned that when piston 172 is in its rest position, flange 218 will prevent light from reaching it. The output of photocell 223 is connected through lead 244 and an inverter circuit 246 to a further input 248 of ring counter 242 and serves to reset and hold the counter in its $M_0$ state whenever clamping block 196 is fully retracted and cell 223 is blocked. Whenever air is introduced into cylinder 169 and the clamp moves forward, successive movements will cause ring counter 242 to be advanced through its states, thereby giving a quantized indication of the width of the piece of lumber being cut.

In FIG. 9 is shown schematically the apertures in plate 232 whereby normal, oversize, and undersize indications may be provided for each of the board widths to be cut. As may be seen, a first aperture 250 labelled "rest position" is aligned with photocell 223 to reset ring counter 242. Following aperture 250 is a group of three apertures 252, 254, and 256, which is so located that when a large board, e.g. a 2×8 is being cut, a slightly oversized board will cause clamping block 196 to travel only a sufficient distance so that the photocell in aperture 252 alone is blocked. If the 2×8 is of normal dimensions, the clamping block will travel a sufficient distance to cause first aperture 252 and aperture 254 to be covered, causing ring counter 242 to step first into its $M_1$ state (upon the blocking of aperture 252) and then into its $M_2$ state (upon the blocking of aperture 254). Similarly, if the 2×8 board is somewhat undersized, then in addition to the above, the travel of clamping block 196 will cause aperture 256 also to be blocked, advancing counter 242 to its $M_3$ state. As may be understood, the areas 258 and 260 shown in FIG. 8 contain no photo cells, therefore, a quantized indication of the board width will be given. Such quantized indication of the board width is satisfactory for all practical purposes.

Referring still to FIG. 9, at the other end of wall 232, are positioned 3 apertures 262, 264, and 266, which provide an oversize, normal, and undersize indication respectively when clamping board 196 travels its maximum distance, i.e. for the narrowest board, in this case a 2×2. In other words, the first, fourth, seventh and tenth aperture (excluding aperture 250) which corresponds to states $M_1$, $M_4$, $M_7$ and $M_{10}$ signify an oversize board, while the apertures corresponding to states $M_2$, $M_5$, $M_8$, and $M_{11}$ represent a normal board, and apertures corresponding to states $M_3$, $M_6$, $M_9$, and $M_{12}$ represent undersize boards. The actual width is not significant since only a one-out-of-three selection is to be made.

Clamps 144 and 160 are of the same construction as that shown in FIG. 7 except that the shaft 186 and the entire photocell assembly are not present. Of course, cylinder wall 194 does not include the aperture 192 therethrough, but the construction and operation is otherwise identical.

As shown in FIGS. 1, and 3 through 5, radial arm saw 28 is pivotally mounted on shelf 26 of saw table 12, whereby the saw blade 168 is angularly positionable within ±90° from its normal position as in FIG. 5. Adjustment of the angular position of blade 168 is accomplished by means of a step motor 268 which drives a worm gear 270 and wheel 272. Geared wheel 272 is rigidly coupled to a rear column 274, which supports a housing 276 at the upper end thereof. Within housing 276 is mounted an extensible arm 278 and with a reversible operating mechanism 280 including an electric motor 282, a lead screw 284, and a threaded follower 286 attached to arm 278.

Geared wheel 272 is rigidly attached to a vertical shaft 288 positioned within a dust-proof housing 290 resting on shelf 26 (see FIG. 3). Housing 290 includes an upper bearing 292 and a lower bearing 294 for rotatably supporting shaft 288.

An upper portion 296 of shaft 288 extends through an aperture 298 in the top of housing 290 and is rigidly connected to an elongated tongue 300 which extends forward from the base of column 274. Tongue 300 includes stepped shoulders 302 and 304 adapted to rest directly on the upper surface 304 of housing 290, or may include suitable rollers (not shown) to facilitate the movement thereof when wheel 272 is driven.

As shown in FIGS. 3 and 5, vertical shaft 296 is located directly below fence 158. Therefore column 274 travels over an extended arc as the blade angle is varied by step motor 268. While such a construction requires movement of a large mechanism, i.e., the entire saw 28, it has the advantage that irrespective of the angle at which the blade 168 is set, the saw crosses fence 158 at precisely the same point each time, simplifying the numerical control system and the operating program.

Motor 282, a reversable motor of any suitable type, drives lead screw 284 which extends the full length of housing 276 within arm 278. Arm 278 is a hollow rigid beam within which screw 284 travels. At the rear end thereof, is affixed the follower 286 which cooperates with lead screw 284 to extend and retract arm 278 in accordance with the direction of rotation of motor 282. As shown in FIGS. 3 and 4, one side of housing 276 is open, thereby exposing arm 278 and facilitating the attachment of a saw carrrige 306 thereto. The saw carriage 306 is of a conventional type such as is commonly used with radial arm saws, and includes a blade motor 307 and suitable means for attaching blade 168 thereto. Carriage 306 is bolted or otherwise secured to arm 278 by means of a bracket 303.

Referring to FIG. 3, a pair of microswitches 310 and 312 are mounted at the front and back ends respectively of housing 276 and are adapted to cooperate with an upwardly exending finger 314 attached to the back end of arm 278. Microswitches 310 and 312 are so positioned that when arm 278 is extended its maximum forward distance, microswitch 310 is actuated to provide an electrical signal denoted as $S_5$ which initiates the reversal of motor 282 in order to return arm 278 to its rest position. The rear microswitch 312 is actuated when arm 278 is in its rest position, fully retracted, to provide a signal denoted as $S_6$ which serves, as explained below, to turn off both arm motor 282 and saw blade motor 307 after a cut has been completed.

The numerical control system for operating the above described apparatus is housed in console 18 which provides a suitable dust-proof enclosure therefor. Console 18 carries a tape transport 316 for reading a punched paper or plastic tape 318 by which the numerical information for control of the cutting process is supplied to the machine. Console 18 further includes a material instruction display panel 320, and an operation instruction display panel 322 by which the sawyer is provided all the information necessary to permit him to cut the entire truss. Display panel 320 includes an array of indicators 324, each of which comprise a translucent panel 326 having inscribed thereon the particular information to be conveyed. For example, a first series of 16 indicators are provided under the heading "LENGTHS" by which the operator may be instructed to select a piece of stock lumber of sufficient length for the particular segment of the truss to be cut. A second group of four indicators under the heading "SIZE" is provided to identify the cross-sectional dimensions of the lumber, e.g., 2×3, 2×4, etc. In similar fashion, there are provided groups of indicators under the headings "QUALITY" and "SPECIES" to further identify the particular piece of lumber to be cut.

Operation instruction display panel 322 includes six similarly illuminated and inscribed indicator panels 328 to provide the sawyer with step by step instructions as to the cutting of each segment in a given truss. For example, in the particular embodiment shown herein, the six indicators 132 may represent the following instructions: "NEXT BOARD", "DOUBLE CUT", "OTHER END OF BOARD", "END OF TRUSS", "ERROR ON TAPE", and "READY". As will be explained below, the instructions "DOUBLE CUT" and "OTHER END OF BOARD" are not really necessary, but simply serve to apprise the operator of the nature of the next step to be carried out. Similarly, the "ERROR ON TAPE" instruction serves only to warn the operator that improper information has been received, so that futher lumber will not be cut and perhaps wasted without first ascertaining and correcting the source of error.

As may be understood, the "NEXT BOARD" and "END OF TRUSS" instructions indicate to the operator that new lumber is to be obtained and/or that the previously cut material is to be collected and identified as belonging to one particular truss. The "READY" instruction is provided when manual steps in the cutting operation are to be taken. As noted above, convenience and flexibility dictate that the system does not operate in a completely automated manner; therefore, at certain points in the operational program, control is temporarily turned over to the sawyer for certain steps. Following the completion of such steps, the system returns to automatic operation.

Electronics console 18 further includes a series of manual registration units 330 by which numerical information can be directly inserted into the system for semi-manual setting of the dimension and angle at which a particular cut is to be made. As explained below, the operator merely sets registration units 330 to the desired angle and dimensions. He then depresses the appropriate one of control switches 34, and the registered information is automatically recorded and the system is conditioned for completely manual operation. Such operation would be desirable, for example, if a large number of identical segments are to be cut, or if the apparatus is to be used for some purpose other than the manufacture of trusses as described herein. As may be understood, the automatic setting of the dimensions and angles in response to the insertion of numerical information by means of units 134, is considerably more accurate and rapid than the manual setting of the saw and the measuring stops and in addition provides considerable flexibility in the use of the apparatus.

In addition, electronics console 18 may include suitable on-off switches such as 332 and 334 by which various portions of the system may be initially placed in operation.

Referring now to FIG. 10, there is shown a generalized block diagram of the above described numerical control system. Shown are display panels 320 and 322, a board width selection unit 336, including the board width sensor 156 shown in FIG. 7, tape transport and reader 316 and a tape stepping logic unit 338. The system also includes an instruction translator 340, dimension and angle memory 342, manual angle and dimension registration unit 330, angle indexer 344, which controls saw step motor 268, a coarse length indexer 346 which controls measuring stops 106 and 132 and a fine length indexer 348 for controlling carriage step motor 150, an operation sequencer circuit 350 which provides over-all program control for the entire system, and an indexing and cutting operation programmer 351 which directs the setting of the angles and dimensions, and the operation of the saw 28.

The information to be displayed on panels 320 and 322 is provided over a pair of signal paths, generally denoted as 352 and 354 from instruction translator 340 while operational control is provided over a further pair of signal paths 356 and 358 from operation sequence 350. Numerical information is supplied from tape reader 316 over a signal path 360 to instruction translator 340 and thence over a parallel signal path 362 to dimension and angle memory 342, described in detail below. Manual registration units 330 are directly connected to memory 342 by signal path 364.

Tape reader 316 is of any suitable well known type, and operates under the control of tape stepping logic circuitry 338 to insert numerical information and commands into the system.

Instruction translator 340 receives the numerical information from tape reader 316 and converts it into an appropriate form for use by the remainder of the system. As previously indicated, instruction translator 340 provides outputs over a series of leads 352 and 354 to display panels 320 and 322 and over a series of leads 362 to dimension and angle memory 9. In addition, to the previously mentioned outputs on signal paths 352, 354 and 362, various operational commands are provided over signal path 366 to operation sequencer 350.

Operation sequencer 350 operates as described below to condition portions of the system at appropriate times in the operation cycle to establish the order of the various steps which take place during the cutting of all of the lengths and angles of the segments of a truss. Operation sequencer 350 controls display panels 320 and 322 over signal paths 356 and 358 as previously mentioned; and is also connected over signal paths 368, 370, 372, and 374 to tape stepping logic 338, board width selection unit 336, indexing and cutting operation programmer 351 and dimension and angle memory 342, respectively.

Since the nature of the cutting operations are such that a certain amount of manual control is desirable, sequencer 350 is arranged so that during the operational cycle, automatic control of the system is halted, and external manual control transferred to the machine operator. Return to automatic operation is accomplished by the depression of one of manual switches 34, which steps the tape reader to the next row of information, and re-establishes automatic control. The manual tape step command (which also serves to start the operation of the system) is provided over lead 376 to tape stepping logic 338 from the switch 34. Operation sequencer 350 and tape stepping logic 338 serve as a closed loop clock when the system is operating automatically; therefore, the output of tape stepping logic 338 is returned to operation sequencer 350 over lead 378 to indicate that the tape has been advanced and read, and to prepare sequencer 350 for the next command.

Board width selection generator 336 is connected to memory 342 by a signal path 380 and operates under control of sequencer 350 to select the appropriate angle and dimensions fortthe width of the board being cut.

Memory 342 includes three registers for angle information, and 9 registers for dimension information. According to the particular embodiment shown, a single word (including a plus or minus sign) characterizes each angle at which the lumber is to be cut; however, in order to provide sufficient dimension accuracy, a separate number characterizing the length in feet, the length in inches, and the length in 1/32 inches is necessary. Since three separate numbers are provided for each dimension and angle, there is required three numbers (and three corresponding registers) for each angle and nine numbers (and nine corresponding registers) for each dimension. The numbers provided over signal path 362 are stored in appropriate registers within memory 342 under control of operation sequencer 350 over lead 374. In response to board width selection signals over signal path 380, appropriate commands are provided to angle indexer 344, to coarse length indexer 346 and to fine length indexer 348 for repositioning the associated measuring stops and stop motors.

The operation of indexers 344, 346 and 348 is controlled over signal paths 382, 384, and 386, respectively by indexing and cutting operation programmer 351. Programmer 351 operates under the control of sequencer 350 and by external signals from switches 34 to extend clamps 144, 146 and 160 to start the saw blade motor 307, to advance and retract arm 278, and to initiate the setting of the indexers. The various functions controlled by programmer 351 are so interconnected as to prevent the initiation of a subsequent operation before completion of required prior operations, both to promote operation safety and to assure accurate, rapid and economical completion of the truss. Thus, information is returned to programmer 351 over signal paths 388 and 390 from indexers 344 and 348, respectively, and over signal path 392, from various machine sensors, described in detail below. Actuation signals are provided over signal path 394 to the various clamp operating solenoids, to saw motor 307, and to the saw arm motor 282.

As previously mentioned, there are three basic configurations existing in which a given truss segment may be cut; in general, each truss may comprise one or more segments of each configuration. In order to provide complete automation and flexibility, the numerical control system of the present invention is adapted to automatically, and conveniently accommodate truss segments of all three configurations in any order and without the necessity of removing the piece of lumber from the machine until it is completely cut.

Thus, according to this invention, once the particular piece of lumber has been identified by means of material instruction display panel 320, the piece of lumber is chosen and placed on conveyor 14 and positioned against the first lumber stop 132 (see FIGS. 4 through 6) which stop is automatically extended during the time that information as to the required angles and lengths is being read into the system. In this way, stop 132 provides an initial reference mark $L_1$ relative to which all future cuts in the truss segments are made. The system is so arranged that all subsequent cuts are made by simply moving the board to the right along measuring table 16, and abutting it against each of the stops 132 or 106 as they extend in sequence during each cut. In other words, at no time is it necessary for the piece of lumber to be moved to the left in order to make a subsequent cut, nor will there ever arise the situation in which a stop, having once been covered by the rightward movement of the piece of lumber, will be extended against the weight of the piece of lumber, thereby causing damage to it and possibly to the lumber as well.

These statements may be more clearly understood by reference to FIGS. $11_a$ through $11_c$ which show the three basic configurations of the truss segments. In FIG. $11_a$, is shown what may be denoted as the "SINGLE-SINGLE" segment which is characterized by a single cut at each end at angles $a_1$ and $a_2$, separated by a distance $L_2$. The piece of lumber shown in FIG. $11_a$ is placed on the saw table 12 as shown in FIG. $11_a$, i.e. the upper edge 396 thereof rests against guide fence 158. The points A and B represent those points at which saw blade 168 enters the piece of lumber through fence 158, and the angle $a_1$ and $a_2$ represent the complements of the angles to which the saw blade must be adjusted by step motor 268.

Shown in outline in FIG. $11_a$ is a waste portion 398, which remains after the initial cut is made at angle $a_1$. The end of the board 400 is located at point $L_1$ which point is determined by the initial position of stop 132. The second cut is made at point B, a distance $L_2$ from the initial cut at point A; therefore the information provided on tape 318 is such that the second lumber stop position is a distance $L_2$ from the initial position at $L_1$. If the truss segment is of the SINGLE-SINGLE type as shown in FIG. $11_a$, the numerical information provided on the tape is as follows:

1. A first series of three numbers representing the alternative values (for oversized, normal or undersized lumber) representing the angle $90°\text{-}a_1$.

2. A series of nine numbers representing the distance $L_2$ in (a) feet (three numbers) (b) inches (three numbers), (c) 1/32 inch (three numbers);

3. Three numbers representing the angle $90°\text{-}a_2$.

Referring to FIG. $11_b$ there is shown what may be denoted as the DOUBLE-SINGLE truss segment, which includes a first cut at angle $a_1$, and a second cut at angle $a_2$ at the same end of the board. The saw enters the board at point A for angle $a_1$, and at point B for the angle $a_2$, points A and B being separated by the distance $L_2$. By comparison of FIGS. $11_a$ and $11_b$, it may be seen that the only difference between a single cut at both ends (FIG. $11_a$) and a pair of cuts at one end (FIG. $11_b$) is that angle $a_2$ in the SINGLE-SINGLE segment is less than 90° while the angle $a_2$ in DOUBLE-SINGLE segment is greater than 90°. Therefore, no identifying information is in reality necessary, other than the distance $L_2$ and the value of angles $a_1$ and $a_2$.

For the DOUBLE-SINGLE segment shown in FIG. $11_b$, a third cut at angle $a_3$ is made at the far end of the board. For this cut, the saw enters the lumber at the point labeled C, a distance $L_3$ from the point B. Thus, following the insertion of information regarding angles $a_1$, $L_2$, and $a_2$, a series of nine numbers representing the components of $L_3$ and a series of three numbers representing the alternative values of $a_3$ are provided on the tape which are read, and utilized by the system as described below. In order to distinguish between the SINGLE-SINGLE segment and the DOUBLE-SINGLE segment, in the former case, instead of information regarding length $L_3$ and angle $a_3$, there is provided a "NEXT BOARD" or "END OF TRUSS" which resets the system.

In similar fashion, FIG. $11_c$ shows the nature of the DOUBLE-DOUBLE segment in which two cuts are present at each end of the board. Again, the first three cuts are made at points A, B, and C, and an additional fourth cut making an angle $a_4$ is made at point D. As in the case of the DOUBLE-SINGLE segment points A and B are separated by the distance $L_2$ and points B and C are separated by the distance $L_3$. In addition, points C and D are separated by the distance $L_4$. Thus, in order to make the DOUBLE-DOUBLE segment, in addition to the information regarding angles $a_1$, $a_2$ and $a_3$, and lengths $L_2$ and $L_3$, a further series of nine numbers representing the components of $L_4$ and a series of three numbers representing the alternative values of the angle $a_4$ are provided on tape 318 instead of the NEXT BOARD or END OF TRUSS words which would follow the $a_3$ numbers in the case of the DOUBLE-SINGLE segment. Thus, the entire process is auotmatically controlled simply by the number and identity of the words appearing in succession on the tape, and no external setting of the machine to accommodate such variety of segments is necessary.

It should be noted, that in reality there are fourth and fifth types of truss segments which are derivitives of those segments shown in FIGS. 11a through 11c. These types of segments are characterized by either a single or double cut at one end and by no cut or a right a angle at the other end. Such segments may of course be accommodated in the present system, with no difficulty by recording on tape 318, sufficient information for the particular angles and lengths needed, followed either by the NEXT BOARD or END OF TRUSS words.

Figure 12:
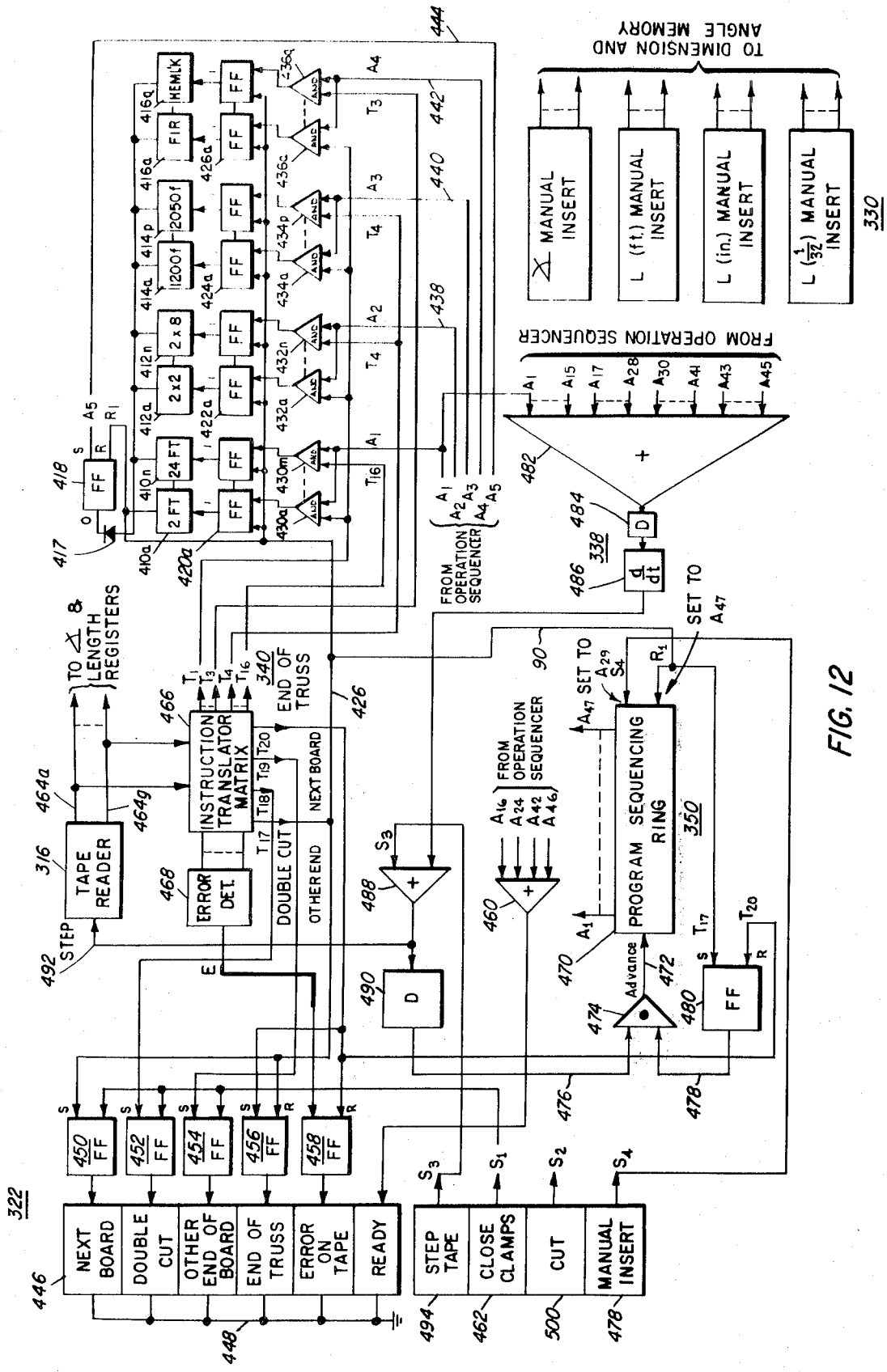

In FIGS. 12 through 16, is shown a detailed block diagram of the numerical control system of FIG. 10. FIG. 12 shows the details of display panels 320 and 322 tape reader 316, instruction translator 340, operation sequencer 350, tape stepping logic unit 338, and manual registration unit 330.

Display panel 320 includes a plurality of illuminated two-terminal indicators $410_a$ through $410_m$, $412_a$ through $412_n$, $414_a$ through $414_p$, and $416_a$ through $416_q$ representing the initial lumber length, the cross sectional dimensions, the quality and the type of wood, respectively. All of the indicators are connected in common at one terminal through a diode 417 to the ZERO level output of a first flip flop 418, which is selectively operable to condition or extinguish simultaneously all of the indicators. The second terminal of each of the indicators is connected to a respective one of flip flops $420_a$ through $420_m$, $422_a$ through $422_n$, $424_a$ through $422_p$ and $424_a$ through $424_q$, in order to provide selective illumination thereof. The reset input of all of the above denoted flip flops are connected in common over a lead 426 to instruction translater 340 which provides a signal thereon whenever the NEXT BOARD word is read on the tape. In response to such a signal, all of the flip flops are reset, extinguishing all of the indicators in panel 320.

The SET input for flip flop 418 is provided over lead 428 when operation sequencer 350 is in the $A_5$ state as explained below. The remaining flip flops are driven by a series of coincidence gates $430_a$ through $430_m$, $432_a$ through $432_n$, $434_a$ through $434_p$ and $436_a$ through $436_q$. A conditioning input to gates $430_a$ through $430_m$ is provided over lead 438 during the sequencer state $A_1$; similarly, conditioning inputs to gates $432_a$ through $432_n$, $434_a$, through $434_p$, $436_a$ through $436_q$ are provided over leads 440, 442, and 444 during sequencer states $A_2$ through $A_4$.

The second inputs to the above denoted coincidence gates are provided by appropriate ones of a series of 16 leads comprising signal path 352 from instruction translator 340. In the present machine embodiment, there is made provision for 16 possible lengths of the starting lumber, four different lumber cross sections, four different lumber qualities, and three different starting materials. However, only 16 connections are required between translator 340 and the coincidence gates associated with material instruction display panel 320, since the leads may be used in common by all of the gates due to a time sharing thereof under control of sequencer 350.

In particular, the words identifying the length, cross section, etc. of the required number appear in sequence on the tape. Therefore, the corresponding coincidence gates may be conditioned in turn during the $A_1$ through $A_9$ states of sequencer 340 to register each word on the appropriate indicators. The same word, e.g. $T_1$ may represent the word 2 FT. or 2×2 depending upon whether it occurs during the $A_1$ or $A_2$ state of sequencer 350.

Thus, in response to successions of signals in signal path 352, coupled with appropriate conditioning signals on leads 438, 440, 442 and 444, one of the flip flops in each of the groups $402_a$ through $420_m$, $422_a$ through $422_n$, $424_a$ through $424_p$ and $426_a$ through $426_q$ will be set. However, in order not to confuse the operator, none of the indicators 412, etc. are illuminated until all the information is received due to flip flop 418 being initially reset. After all the information is received, sequencer 350 enters the $A_5$ state and flip flop 418 is set, thus providing a conduction path for the indicators appropriately conditioned by the previously set flip flops.

Display panel 322 comprises a series of illuminated indicators 446, each bearing the appropriate designation to provide the sawyer with the operational commands previously outlined.

One terminal of each of indicators 446 is connected in common to ground potential over lead 448, while the second terminal is selectively operated in response to signals from translator 340.

Each of indicators 446 except the READY indicator is connected to one of a series of flip flops 450-458, the setting inputs of which are connected to instruction translator 340. Flip flops 450-456 are set when words NEXT BOARD, DOUBLE CUT, OTHER END, and END OF TRUSS, respectively are present on the tape. Flip flops 450-454 is reset by means of a signal appearing over lead 460 from a manually operated switch 462 which is depressed by the sawyer in order to lock clamps 154, 156 and 161. Flip flops 456 and 458 are reset by the NEXT BOARD word, and the END OF TRUSS words, respectively. The READY indicator requires no flip flop, but is connected by means of an OR gate 462 to program sequencer 350. The READY indicator is illuminated by a signal from OR gate 462 only when automatic control is to be halted, and operation turned over to the sawyer. This occurs during the $A_{16}$, $A_{29}$, $A_{42}$, and $A_{54}$ states, as explained below.

Tape reader 316 provides a series of electrical signals on leads $464_a$ through $464_q$ representative of the code word present on the tape. To conveniently accommodate all of the input information required for operation of the system, e.g., the material identification words for display panel 320, the operational commands for display panel 322 and the angles and dimensions at which the lumber is to be cut, a suitable coding scheme has been devised. In the embodiment shown, tape reader 316 may be adapted to accommodate a standard eight hole tape; thus, an eight bit code is employed. Accordingly, there are $2^8 \cdot 256$ different code words available.

As previously described, saw blade 168 is positionable at 1° increments slightly less than plus or minus 90° from the reference position taken to be exactly perpendicular to guide fence 158. Thus, in addition to the sixteen material instruction words and the four operation instruction words, there must be provided 180 angle instruction words to uniquely identify the angular position at which the saw is to be set. As in the case of the material instructions, the 180 angle instruction words may be time shared to provide the dimension instructions by conditioning the appropriate storage registers in synchronism with the arrival of the corresponding instruction words.

Instruction translator 340 serves to convert the incoming information provided over leads $464_a$ through $464_g$ from tape reader 316 into an appropriate form for use by the remainder of the system. Translator 340 comprises a suitable coding matrix 466 and an error detection logic circuit 468. Matrix 466 may be a semiconductor, or ferrimagnetic, etc. matrix of any known configuration and serves to convert each of the eight bit code words corresponding to the material instruction words into a single output in one of terminals $T_1$ through $T_{10}$, and to convert the NEXT BOARD, DOUBLE-CUT, OTHER END OF BOARD, and END OF TRUSS words into a signal at one of outputs $T_{17}$ through $T_{20}$, respectively. The angle and dimension instruction words may be directly processed by the remainder of the system in the form of the eight bit code; therefore translator matrix 466 provides a direct connection from tape reader 316 to angle and dimension memory 342.

Error detection logic circuit 468 analyses the incoming code words to determine whether an error is present on the tape. In its simplest form, error detector 468 may simply comprise an OR gate connected to outputs of matrix 466 representing those of the 256 possible code words which are not used for information. A more sophisticated error detector would be arranged to analyze each incoming word and to reject even proper words if received at unexpected, or improper times in the operational sequence. In addition, if $2^7$ or less unique information words are required (or if a tape system having greater than eight holes per word is used) than one or more parity bits may be used in order to provide an indication of the presence or absence of error on the tape. An output from error detector 468 sets flip flop 548 to provide an alarm if incorrect information is being received.

Operation sequencer 350 and tape stepping logic 338 cooperate to form a closed loop pulsing system by which automatic control of tape reader 316 is effected. Sequencer 350 comprises a 47 state ring counter 470, each of which states is successively activated one at a time, by signals at an advancing input 472. Ring counter 470 includes second and third inputs 474 and 476 by which it may selectively be set into two particular states, namely the $A_{29}$ and $A_{47}$ states.

When manual insert switch 478 is depressed a signal denoted as $S_4$ is generated and counter 470 is placed in the $A_{29}$ state to permit angle and dimension information from registration unit 330 to be entered into memory 342. Similarly in response to the receipt of a NEXT BOARD word by instruction translator 340, the counter is set into the last state, i.e. state $A_{47}$.

Advance signals are provided in terminal 472 from a coincidence gate 474, which receives a first input over lead 476 from tape stepping logic 338 and a second input over lead 478 from a flip flop 480. Flip flop 480 is set when the $T_{17}$ NEXT BOARD word is received by instruction translator 340 to provide a conditioning signal for coincidence gate 474. When gate 474 is so conditioned, and a pulse signal appears on lead 476, counter 470 is advanced one state. Flip flop 480 is reset by the $T_{20}$ or END OF TRUSS word is received by instruction translator matrix 466 to prevent further advancement of counter 470 until a NEXT BOARD word is again present on the tape.

As previously mentioned, various portions of the cycle generated by sequencing ring 470 call for successive automatic steps without any action by the sawyer. Among the automatic operations of this type are the successive storage steps by which each of the three angle instructions and nine dimension instructions are stored in memory 342. In each of these steps, successive operations of tape reader 316 are accomplished by appropriate connection of the outputs of sequencing ring 470 to tape stepping logic 338. Tape stepping logic 338 comprises a multiple input OR gate 482, a delay circuit 484, and a differentiation circuit 486, a second OR gate 488 and a delay unit 490.

The outputs of sequencing ring 470 representing states $A_1$ through $A_{15}$, $A_{17}$ through $A_{28}$, $A_{30}$ through $A_{41}$, and $A_{43}$ through $A_{54}$ are connected as inputs to OR gate 486. Thus, when ring counter 470 is in any of these states, a delayed signal is transmitted to the input of differentiator 486, which responds to the leading edge thereof, and provide a pulse input to OR gate 488. The output of OR gate 480 is provided to an advance input 492 of tape reader 316 which steps the tape forward and causes the next word on the tape to be read.

OR gate 488 receives as a second input a signal denoted as $S_3$ from tape stepping switch 494 in order to return the system to automatic operation following the required manual steps, or to initiate the operation of the system at the time a new tape is inserted into tape reader 316. The advance input for operation sequencer 350 is provided by OR gate 488 through a delay circuit 490, which delay is of appropriate duration to maintain accurate synchronization between the various steps in the program.

Manual angle and dimension registration unit 330 comprises a plurality of decade potentiometers or continuous potentiometers coupled with suitable quantizing circuitry. These circuits serve to permit the direct insertion into the system of particular angles and dimensions at which a piece of lumber is to be cut. The desired numbers are set in circuit 330 and manual insertion switch 478 is depressed. This causes the signal $S_4$ to set sequencing ring 470 in the $A_{29}$ state as previously mentioned, and in addition, it establishes indexing and cutting operation programmer 351 in the condition required for non-automatic operation with the manually inserted angle and dimension data as described below.

Figures 13, 14:
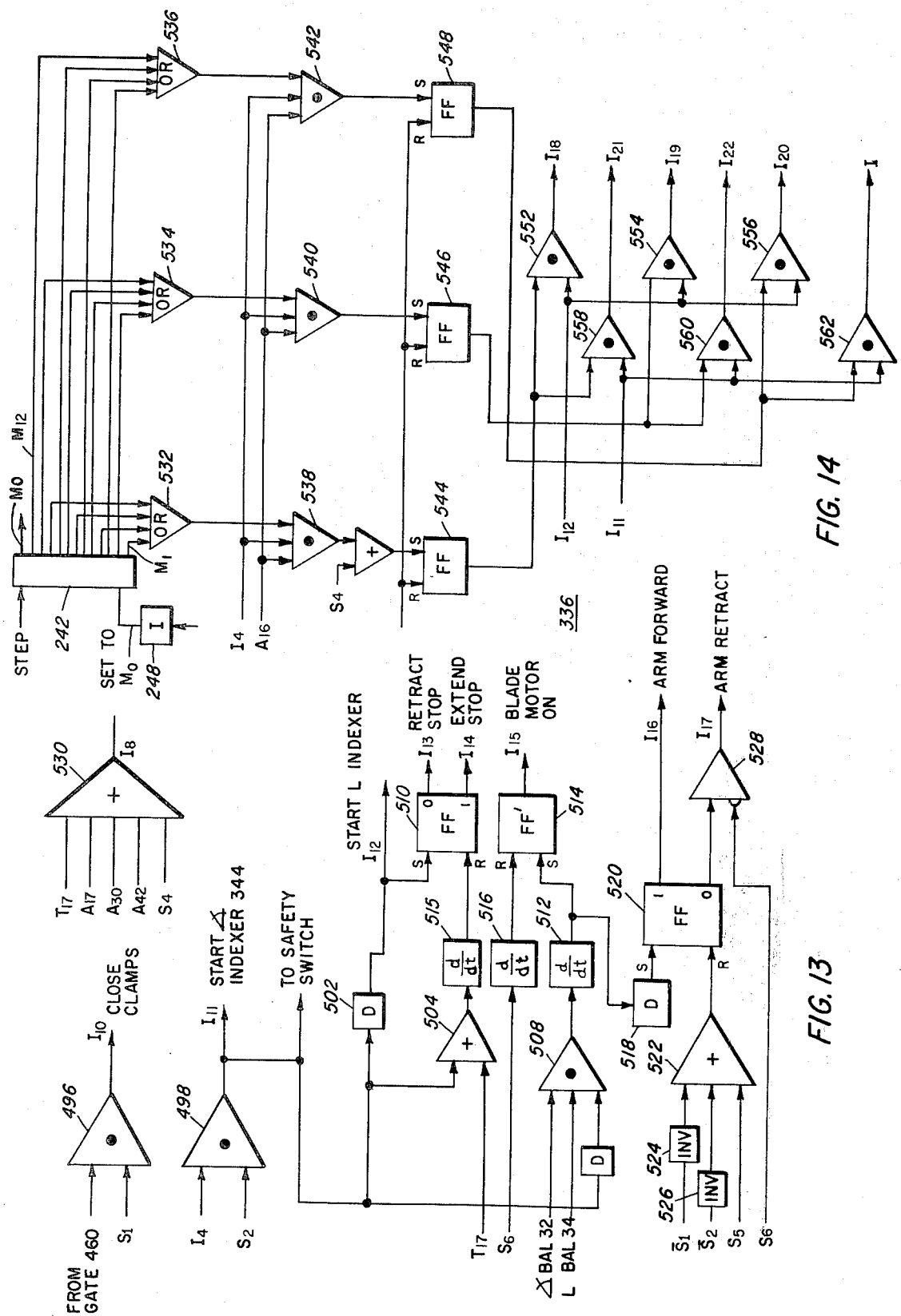

In FIG. 13 are shown the details of indexing and cutting operation programmer 351. A first coincidence gate 496 is connected to the output of OR gate 460 and switch 478. The output of gate 496, denoted as $I_{10}$, is connected to the solenoids of valves 178 and 182 as described in connection with FIG. 7. Thus, if ring 470 is in any of the $A_{16}$, $A_{29}$, $A_{42}$, or $A_{54}$ states, and the operator depresses switch 462 the cutting operation is initiated. If ring 470 is not in the above states, the system is in automatic operation and the sawyer cannot interrupt the sequence.

Assuming the system is conditioned for manual operation, the claims close, and microswitches 206 are actuated, coincidence gate 214 (FIG. 7) is activated and provides a signal denoted in $I_4$ to condition a second coincidence 498. A second input to gate 498 denoted as $S_2$ is provided when cut switch 500 is depressed by the operator. Upon coincidence of signals $S_2$ and $I_9$, a signal $I_{11}$ is generated by gate 498 to initiate the operation of angle indexer 344. $I_{11}$ is also connected to a delay circuit 502, an OR gate 504, and a further delay circuit 506 which in turn is connected as a first input to a coincidence circuit 508. The $I_{11}$ signal also serves as a safety switch to turn off all motors when either switch 462 or 500 is released.

The output of delay circuit 502, denoted as $I_{12}$ is connected as the set input of a flip flop 510 and as a start signal for fine length indexer 348. The ONE output of flip flop 510, denoted as $I_{14}$, serves as explained below to initiate the operation of coarse length indexer to extend ones of stops 106 or 132, while the complement signal $I_{13}$ initiates the retraction of the stops.

The reset input for flip flop 127 is provided by a differentiator 515 and an OR gate 504 which receives as its second input, the $T_{17}$ or "NEXT BOARD" output of instruction translator matrix 466.

As previously indicated, a first input to coincidence gate 508 is provided through a delay circuit 506 by the output of coincidence circuit 498. The second and third inputs to coincidence gate 508 are provided over leads 388 and 39 from angle indexer 344 and fine length indexer 348, respectively, only when the indexers are balanced, i.e. when the respective step motors are not in motion. The presence of the three inputs to coincidence gate 508 serves as an electronic interlock to prevent the operation of blade motor 307 and arm motor 282, when the indexers are changing either the blade angle or the position of one of the retractable stops.

The output of gate 508 is connected through a differentiation circuit 512 as the set input to a flip flop 514, which in turn provides a signal $I_{15}$ to operate blade motor 307. The reset input to flip flop 514 is provided by means of a further differentiator 516 from the output $S_6$ of rear microswitch 312 (see FIG. 3) whereby the complete retraction of arm 278 causes the blade motor 307 to be shut off.

The output of coincidence circuit 508 and differentiator 512 is provided through a further delay circuit 518 as a set input for an additional flip flop 520, which generates ONE output $I_{16}$ to operate arm motor 202 in the forward direction. The reset input of flip flop 520 is provided from an OR gate 522. The $S_1$ and $S_2$ signals are fed through a pair of inverters 524 and 526 as first and second inputs to gate 522, which inputs are present when switches 462 and 500 are released. A third signal $S_5$ is provided when forward microswitch 310 is actuated by the passage thereover of finger 312 of arm 278. OR gate 522 therefore provides an additional safety interlock whereby the release of either clamp switch 462 or cutting switch 500, or the extension of arm 278 to its maximum position causes the resetting of flip flop 520 and the corresponding reversal of arm motor 282 thereby causing the return of saw carriage 306 to its rest position. The reversal of arm motor 282 may be accomplished in any known fashion by signal $I_{17}$ from a normally conditioned inhibit gate 528 connected to the ZERO output of flip flop 520. The inhibit signal $S_6$ for gate 528 is provided from rear microswitch 312 so that when the saw has completely returned to its rest position, arm motor 282 is stopped.

Indexing and cutting operation programmer 351 includes a further Or gate 530 which generates a signal $I_8$ for dimension and angle memory 342. The inputs for gate 530 are the $T_{17}$ and $S_9$ NEXT BOARD and MANUAL INSERT signals, and signals representing the $A_{17}$, $A_{30}$, and $A_{42}$ states of ring counter 470. As explained below the $I_8$ signal clears the registers in memory 342 in preparation for the storage of new information.

In FIG. 14 are shown the details of board width selection generator 336. The circuitry includes ring counter 242 and inverter 248, previously mentioned, three OR gates 532, 534 and 536, three corresponding coincidence gates 538, 540, and 542, and three flip flops 544, 546 and 548.

Each of the ring counter outputs which corresponds to an oversized board, i.e. $M_1$, $M_4$, $M_7$, and $M_{10}$ are connected to OR gate 352, while each of the outputs corresponding to normal size and to undersized boards are connected to OR gates 534 and 536, respectively. Thus, a signal at the output of one of OR gates 532, 534 and 536 is indicative that the board is oversized, normal or undersized, respectively, irrespective of its actual width.

Board width measurement takes place when the board is first inserted in the apparatus, i.e. immediately prior to the first cut. To this end, the output of OR gates 532, 534, and 536 are connected to coincidence gates 538, 590 and 542, respectively. Second inputs to the coincidence gates are provided from the $A_{16}$ output of program sequencing ring 370. Also, while clamp 156 is closing, no meaningful indication can be obtained from ring counter 242. Therefore, the $I_4$ signal is also connected as an input to gates 538 through 542. Until the $I_4$ signal is present, indicating complete closure of clamp 156, no output is provided from any of the coincidence gates 538 through 542.

As may be understood, depending upon the width of the board, one of the coincidence gates will be activated, thereby providing a set input to one of flip flops 544 through 548. The flip flop remains set until a reset signal, is provided in common to the preset input of all of the flip flops 544 through 548 from the $T_{17}$ output of instruction translator matrix 466.

The output of coincidence gate 538 is connected to the set input of flip flop 544 through an OR gate 550. The second input to OR gate 550 is provided over from manual insertion switch 478, in order to arbitrarilly activate flip flop 544, whenever manually inserted data is to be used to cut the lumber.

Board width selection generator 336 further includes two tri ads of coincidence gates 552–554–556, and 558–560–562. Coincidence gates 552 and 558 each receive a first input from the output of flip flop 544, while coincidence gates 554 and 560 and 556 and 562, each receive a first input in common from the output of flip flops 549 and 548, respectively. The second input to coincidence gates 552–554–556 is provided in common by the $I_{12}$ (start fine length indexer) signal, from indexing and cutting operation programmer 351, while the second input to coincidence gates 558–560–562 is provided in common by the $I_{11}$ (start angle indexer) signal. The outputs of coincidence gates 552–558–556 denoted as $I_{18}$–$I_{20}$ and the outputs of coincidence gates 558–560–562, denoted as $I_{21}$–$I_{23}$ serve to select the appropriate length angle settings in accordance with which of the flip flops 544–548 has been set by board width sensor 156.

Figure 15:
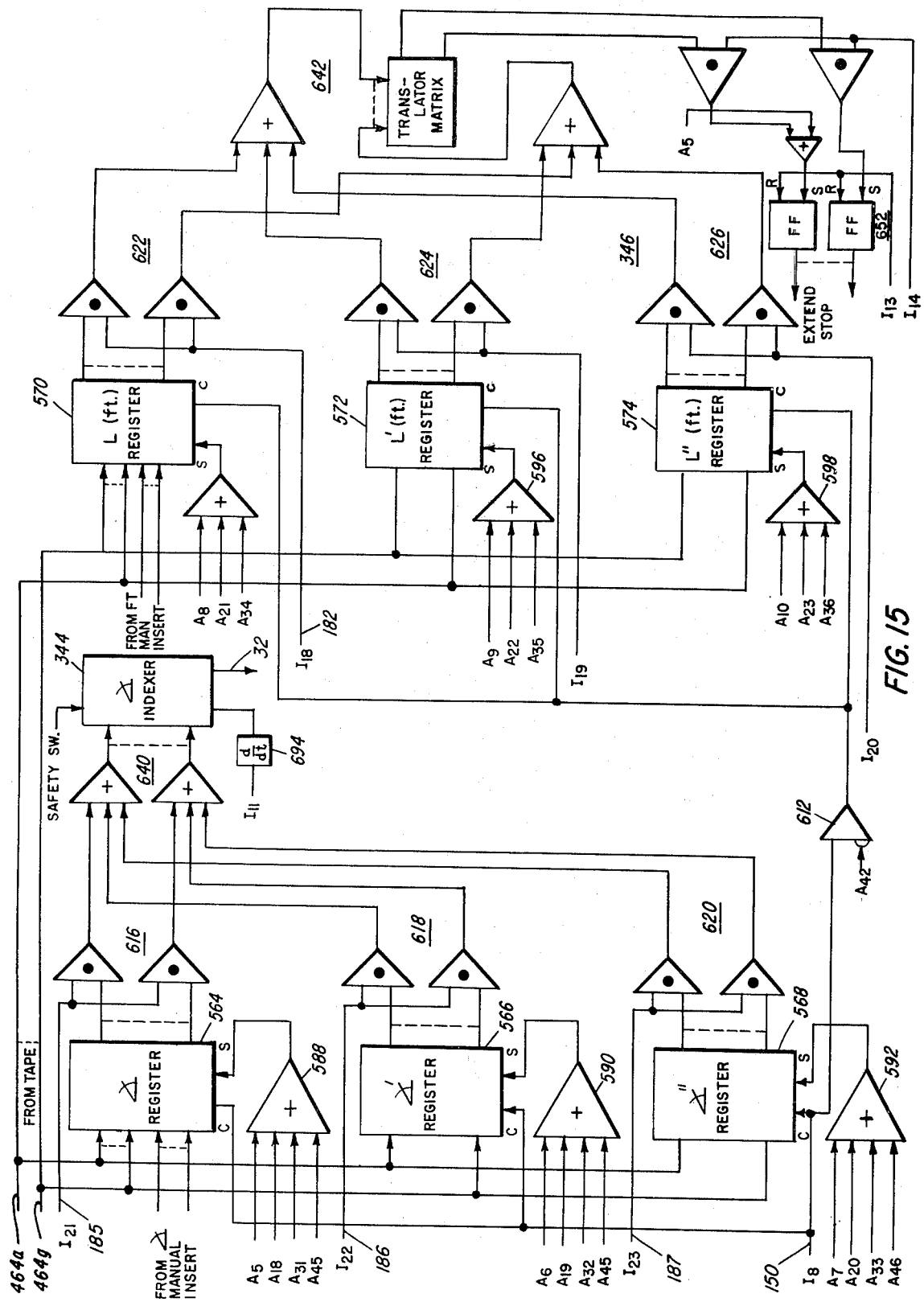
Figure 16:
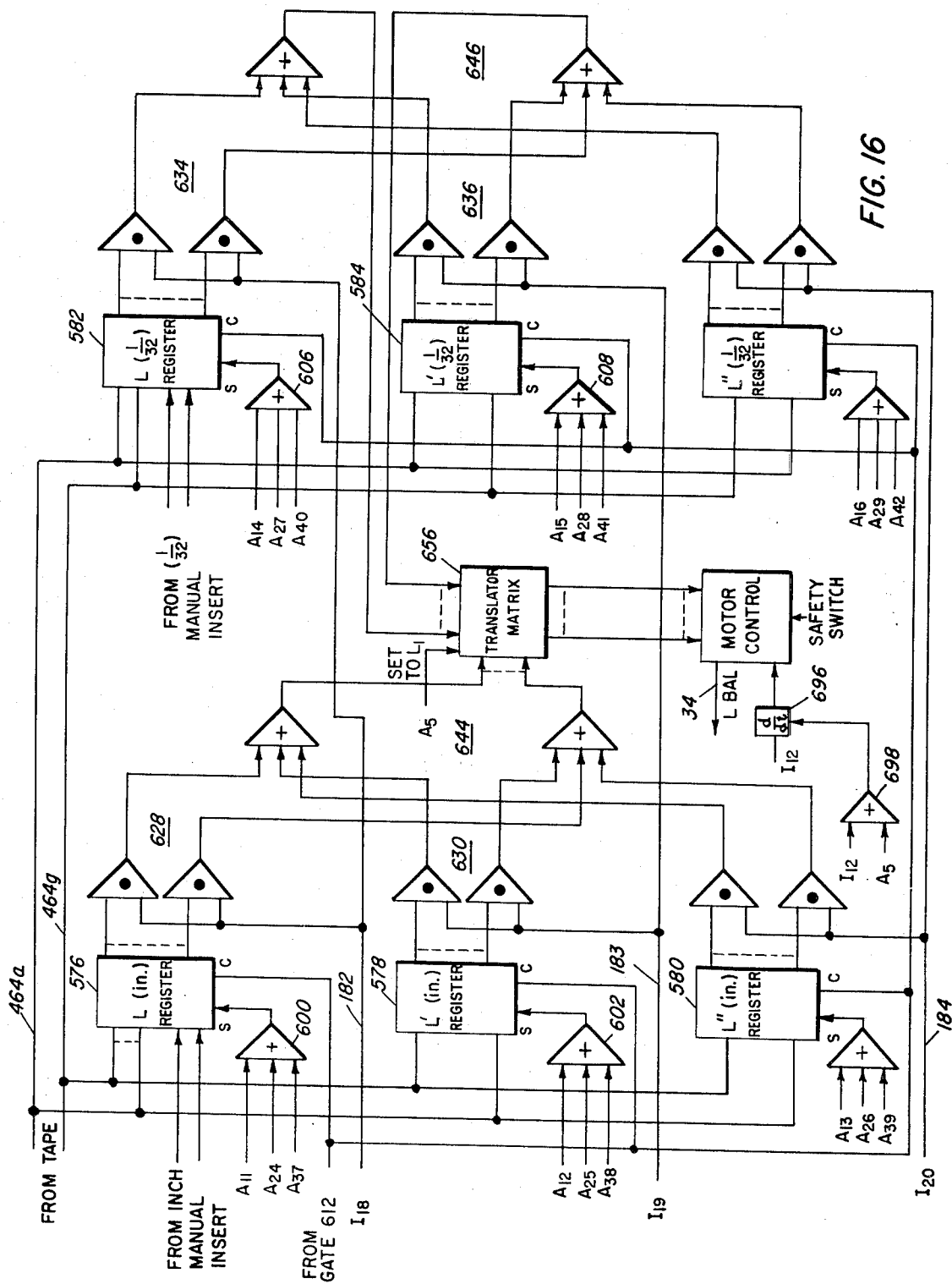

In FIGS. 15 and 16 are shown the details of dimension and angle storage memory 342. As noted, three separated registers are required for the angle command, while nine separate registers are required for the dimension instruction. Accordingly, memory 342 includes angle registers 564, 566, and 568, three L (feet) registers 570, 572, and 574, three L (inch) registers 576, 578, and 580, and three L (1/32) registers 582, 584, and 586. Each of registers 564 through 586 comprises a number of memory elements to accommodate the eight bit code by which the instructions are represented and are all connected in common to leads $464_a$ through $464_g$ of instruction translator matrix 466. Each of the registers further includes internal circuitry to selectively permit the insertion of data into the register, when a signal is present at a so-called SET input and to prevent the insertion of data at all other times. The SET input to each of registers 564 through 586 are provided by a respective one of OR gates 588 through 610. The inputs to OR gates 588 through 610 are provided by appropriate ones of the outputs of program sequencing ring 470, whereby information stored in the various registers can be changed only during predetermined portions of the system operation cycle.

Each of registers 564 through 586 further includes CLEAR input labeled to selectively erase the information stored therein prior to the insertion of new information. The erase signal for registers 564 through 586 is provided by the $I_8$ from indexing and cutting operation programmer 351, however during the $A_{42}$ state, no erasure of registers 570–586 is necessary. Thus, the erase signal for the latter nine registers is delivered provided in common over lead 151, from indexing and cutting operation programmer 351 by an inhibit circuit 512 which is blocked during the $A_{42}$ state. Thus, at appropriate times in the operation cycle, the registers will be cleared, and subsequently, information will be inserted, all under control of operation sequencer 350.

Each output of registers 564 through 586 is connected to individual members of sets 616 through 638 of coincidence gates which serve to selectively switch ones of registers to the indexers 344–348. The enabling inputs for each of sets of gate 616 through 620 is provided by one of signals $I_{21}$–$I_{23}$, while sets of gates 622-638 are enabled by one of signals $I_{18}$–$I_{20}$ from indexing and cutting operation programmer 351. In particular, registers 564, 570, 576 and 582 are adapted to store information for the cutting of oversized boards, registers 566, 572, 578, and 584 are adapted to store information corresponding to normal size boards and registers 568, 574, 580 and 586 adapted to store information corresponding to undersized boards. Accordingly, gate sets 616, 618 and 620 are conditioned by the $I_{21}$–$I_{23}$ signals, respectively. In similar fashion, gate sets 622, 628 and 634 are operated in common by oversize length selection signal $I_{18}$, gate groups 624, 630 and 636 are operated by normal length selection signal $I_{19}$, and gate sets 218, 221 and 224 are operated by undersized length selection signal $I_{20}$.

Once the particular angle and dimension has been selected, the remainder of the system does not require any knowledge as to which selection was made. Accordingly, corresponding outputs from angle selection gate sets 616–620 are connected in common to one of a series of OR gates 640, which provide numerical information to angle indexer 344. Similarly, corresponding outputed of L(feet) selection gates sets 622-626 are connected in common through a second series of OR gates 642 as the numerical inputs to coarse length indexer 364, while the outputs of L (inch) selection gates 628 through 632 and L (1/32) selection gates 634 through 638 are connected in common to sets of OR gates 644 and 646, respectively as to inputs of fine length indexer 348.

Coarse length indexer 346 comprises a translator matrix 648, and a series of coincidence gates 650 which provide setting inputs to a corresponding series of flip flops 652. The reset inputs for flip flops 652 are provided by the $I_{13}$ signal, as previously described. The outputs of each of flip flops 652 are connected respectively to the actuator of one of stop mechanisms 106 and 132 shown in FIG. 1, to extend the stop in accordance with a signal passed from translator matrix 648 whenever coincidence gates 650 are conditioned by the $I_{14}$ signal from programmer 351. The first of flip flops 652 is set by an OR gate 654 which receives both a signal from the first of gates 650, and also the $A_5$ signal. In this manner, the distance L, referred to in connection with FIGS. 11a–11c is set at the beginning of each board.

With regard to fine length indexer 346 a single setting of carriage 58 is effected in accordance with the information provided by one of the L(inch) and L(1/32) registers. Indexer 346 includes a translator matrix 656, and a step motor control circuit 658 described in detail below. Matrix 656 is arranged to respond to a digital code provided from sets of OR gates 644 and 646 to provide a further digital code word which represents, as explained below, the number of independent steps required by the length step motor 150 (see FIG. 5) which would be required to achieve the proper positioning of the extended stop if the indexer were set at its zero position.

Translator matrix 656 also receives the $A_5$ state input which causes it to generate the inch and 1/32 inch setting for the distance $L_1$, whereby the reference distance for carriage 58 is established.

The output of translator matrix 656 is the numerican input to step motor circuit 658, the numerical input to angle indexer 344 is directly provided to a step motor control circuit of the same type as step motor circuit 658 in length indexer 348 without the use of a separate translator since only a single number, i.e. the angle in degrees is employed.

Figure 17:
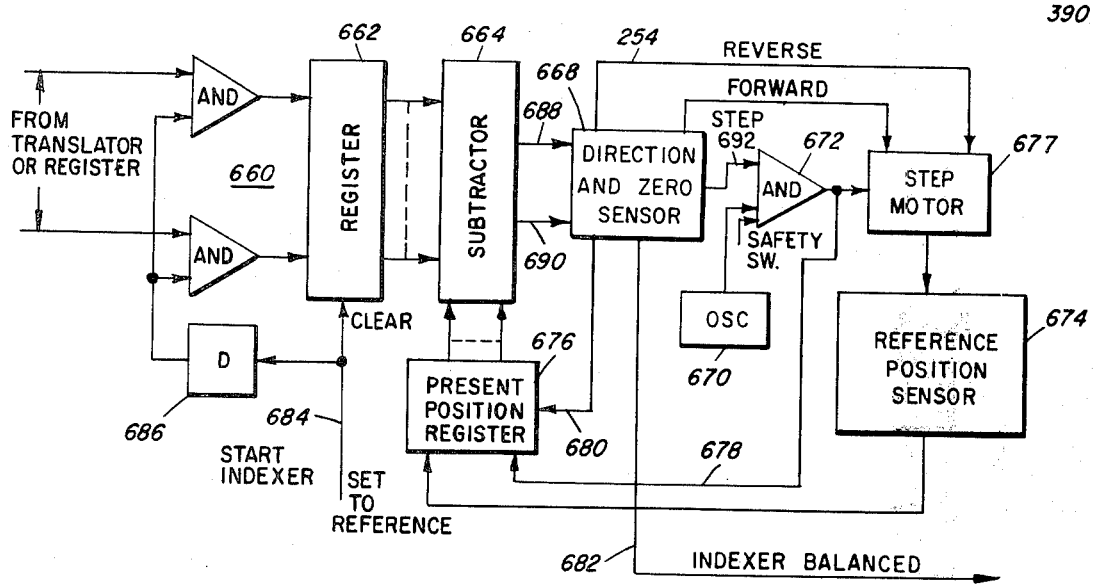
FIGS. 12 through 17 are detailed block diagrams showing various portions of the numerical control system generally shown in FIG. 10.

The details of step motor control circuit 658 are shown in FIG. 17. The circuit includes a series of coincidence gates 660, which receive the input signals, e.g., from translator matrix 656, an input register 662 a digital subtraction circuit 664, a direction and zero sensing circuit 668, a pulse oscillator 670, a further coincidence gate 672, a reference position sensor 674 and a present position register 676. The step motor, denoted at 677 corresponds either to step motor 150 or 268 and may include a mechanical actuator and an associated microswitch (not shown) which comprises reference position sensor 674.

Register 676 comprises a bi-directional counter which counts pulses on lead 678 in the positive or negative direction, with controls signals provided over lead 680 from direction and zero sensor 668.

Register 676 may be set to a reference count by sensor 674 each time the step motor microswitch is actuated in order to provide a periodical recalibration thereof. As may be understood, the step motor may be selectivity set to its reference position by the manual insertion of the corresponding angle or dimension (or by the insertion thereof in the form of appropriate tape instruction).

Direction and zero sensing circuit 668 provides a first output on lead 682 whenever the present position of the step motor as indicated by register 676 corresponds to the desired position as indicated by register 662. The signals on lead 682 correspond to the signals provided over leads 32 and 34 to indexing and cutting operation programmer 351.

Operation of the indexer is initiated by a signal appearing on lead 684 corresponding to the signals $I_{11}$ and $1_{12}$ from indexing and cutting programmer 4. The signal on lead 684 is directly connected to an erase input of register 662, and through a delay circuit 686 to condition the series of coincidence gates 660.

Briefly, the operations of indexer shown is as follows: Under normal conditions, a particular digital number is present at the signal innputs of gates 660, however no signal is present at the output of delay circuit 686, therefore no signals are passed to register 662. When an indexing operation is to begin, the start signal on lead 684 clears register 662, and alter a delay introduced by circuit 686 sufficient to complete the erasure, gates 660 are unblocked. AT this time, the signals appearing at the signal input thereof pass to register 662, causing the incoming information to be stored. The output of register 662 are connected to a digital subtraction circuit 664, a second set of inputs to which are provided by the output of present position register 676. Should there be any difference in the desired position stored in register 662, and the actual position stored in the register 676, subtractor 664 will provide a first output over lead 628 indicating the existence of such difference, and the second output over lead 690 indicative of the sense of the difference, i.e., whether stop motor 677 should advance or reverse. The signals on leads 688 and 690 are provided to direction and zero sense circuit 668 which provides forward or reverse commands to motor 676. Circuit 668 also provides a step output on lead 602 whenever a signal is present on lead 688 to condition coincidence gate 672. Also, the safety switch signal $I_{11}$ is present to permit indexing to occur. The signal input for gate 672 is provided by pulse oscillator 670 adjusted to run at any desired speed. As long as a difference is indicated by subtractor 664, the pulses pass through coincidence gate 672 to operate step motor 677. Each pulse is also provided over lead 678 to update the current count in register 676. This process is continued until registers 612 and 676 contain the same information at which time the signal on lead 652 is removed and step motor 677 rests in its then current position.

As long as a signal appears on lead 668, a corresponding output will be absent on lead 682. As noted, the signal on lead 682 corresponds to one of the inputs 32 or 34 in indexing and cutting operation programmer 351. The absence of a signal or lead 682 serves to prevent subsequent operations until step motor 677 has rebalanced.

Returning now to FIGS. 15 and 16, each of indexers 344 and 348 includes an input and output corresponding to input 684 and output 682 in FIG. 17.

Each input is delivered through one of differentiator circuits 694 and 696. The input to indexer 344 is provided by signal $I_{11}$ while the input to indexer 348 is provided by signal $I_{12}$. An additional input to indexer 348 is provided through an OR gate 698 by state signal $A_5$ to initiate the setting of the reference position $L_1$.

The operation of the above described system for as typical truss segment will now be described. The entire process is initiated by the sawyer by insertion into tape reader 316 of the punched paper tape 318 and the actuation of the electronic circuitry in console 18. After inserting the tape, the operator depresses and releases tape stepping button 494 while watching operation instruction display panel 322. As tape stepping button 494 is depressed, the signal $S_3$ passes through OR gate 488, to input 492 of tape reader 316, causing the tape to advance one word. Tape reader 316 provides the digital code corresponding to the array of punched holes over leads 496a through 494g to instruction transistor matrix 466 which processes the information and provides signal outputs at any one corresponding to the $T_1$ through $T_{20}$ states or other numerical signals as may be received.

The operator continues to depress and release the tape stopping button 494 until the particular word received on tape is NEXT BOARD, which generates the $T_{17}$ output of instruction translator matrix 466. Flip flop 450 is set by the $T_{17}$ signal, and the corresponding "NEXT BOARD" indicator in instruction panel 32 is lit.

Concurrently, the $T_{17}$ signal is provided to various other portions of the system to force the various multistate elements into the required initial conditions for subsequent operation. In particular, the $T_{17}$ signal is provided to reset all of flip flops 418 and 420 through 426 in material instruction display panel 320, to operation sequencer 350 in order to establish program sequencing ring 470 in its $A_{47}$ state, and to set flip flop 480. This provides an output over lead 478 to maintain the counter advancing coincidence gate 474 in its ready condition. In addition, the $T_{17}$ signal is provided to indexing and cutting operation programmer 351 and passes through OR gate 504 to reset flip flop 510, which in turn provides the $I_{13}$ signal to the series of flip flops 652 in order to retract any ofsteps 106 or 132 which might have been extended at that time. The $T_{17}$ signal is also provided to board width selection unit 336 and serves to react the three flip flops 544 through 548 in preparation for a board width selection signal from ring counter 242. Finally, the $T_{17}$ signal is also provided to OR gate 530 to generate the $I_8$ signal which resets all of registers 564 through 586.

At this time, the system is ready to be placed into automatic operation. The sawyer once more depresses the tape stepping button 494, which causes tape render 316 to advance once more by the passage of the $S_3$ signal through OR gate 435 to tape reader input 492. In addition, the output of OR gate 488 passes through delay circuit 490. After a sufficient time to permit the tape reader to advance and the signals on leads 464a to $464_3$ to stabilize, the signal provided over lead 476 passes through coincidence gate 474 (now conditioned by the output of flip flop 400) to the advance input 472 of program sequencing ring 470, which was at that time set in state $A_{47}$ by the previously received $T_{17}$ signal. The advance signal causes ring counter 470 to transfer from the $A_{47}$ to the $A_1$ state. The $A_1$ signal is provided in common as the conditioning signal to all of coincidence gates 430a to 430m. One of gates 430a – 430m responds to a signal from instruction translator 466, i.e. $T_1 - T_{16}$ in order to set one of flip flops 420a through 420n thereby establishing the length of the piece of lumber to be cut.

The $A_1$ signal is also provided as a first input to OR gate 482 in tape stepping logic unit 338, and after a sufficient delay to permit the output of instruction transistor matrix 466 to be stored in one of flip flops 420a through 420a, provides a pulse at the output of differentiator 486 to the second input of OR gate 466, thereby causing tape reader 366 to be advanced one further step. Similarly, the output of OR gate 466 passes through delay circuit 490 to advance ring counter 470 to the $A_2$ state. The $A_2$ signal is provided as the conditioning input to the series of coincidence gates 432a through 432n whereby the second word on tape which is translated by instruction translator 466 (again into one of output words $T_1$ through $T_{16}$) causes the setting of one of flip flops 422a through 422n thereby identifying the cross sectional dimensions of the required piece of lumber.

As may be seen in FIG. 12, the $A_2$ signal and in fact the $A_3$ through $A_{15}$ signals are all provided as inputs to OR gate 432 and cause successive operations of tape reader 316 and ring counter 470 in the manner described above. Thus, ring counter 470 sequences through the $A_1$ to $A_{15}$ states and is then placed in the $A_{16}$ state, which state is not connected to OR gate 432.

During the $A_3$ through $A_{15}$ states, the remainder of the material identification words, i.e. the quality and species are received in sequence from tape reader 316 and are stored in the proper ones of flip flops 422a through 424p, and 426a through 426q. Also the three angle setting numbers and the nine length numbers are received and stored in respective ones of registers 564 through 586 as OR gates 500 through 610 are eporated in requence by state signals from ring counter 470.

In addition to the above operations, during the $A_5$ state, a signal is provided over lead 444 to set flip flop 418 which causes one indicator in each of the material identification display panel groups to complete a circuit from the high output from the set flip flop, through the indicator through diode 417, to the low output of 418. Thus, at this time all of the indicator lights which were set by the material read from the tape during the $A_1$ through $A_4$ states are simultaneously light, thereby establishing the complete identity of the next piece of lumber to be cut.

Also at this time, the $A_5$ signal is provided through OR gate 664 to the set input of the first flip flop in the series of flip flops 652 in order to actuate the pneumatic cylinder 140 for raising lumber stop 132. At the same time, the $A_5$ signal is provided to fine length translator matrix 656 which actuates the proper outputs thereof to cause the inch and 1/32 inch components of the distance $L_1$ to be inserted into the register 662 and motor control 658. The $A_5$ signal also passes through OR gate 698, and after a suitable delay through circuit 696, is connected to the "start indexer" input on lead 634. This causes motor control 653 to set carriage stopping motor 150 in the required position for the reference distance $L_1$. The above operations all take place automatically during the time that ring counter 470 is being sequentially driven through its states $A_1$ through $A_{15}$.

Also at this time, the sawyer, having received during the $A_3$ state the identity of the next board to be cut, selects a board having the required characteristics, places the same on roller conveyor 14, and transports it to the right until it abuts the new extended lumber stop 132, and guide fence 158. The operator then waits if necessary until all of the information which is processed by this system during the $A_5$ through $A_{15}$ states is completely recorded and the system is ready for further operation.

As previously mentioned, the $A_{16}$ output from program sequencing ring counter 470 is not connected to tape stepping logic OR gate 432. Thus, while the $A_{15}$ signal causes ring counter 470 to advance into the $A_{16}$ state, the $A_{16}$ signal does not cause the ring counter to advance into the $A_{17}$ state, nor does it cause the tape reader to advance correspondingly. However, the $A_{16}$ output is provided to OR gate 450 to operate the ready indicator in instruction panel 322. This advises the sawyer that system control has been turned over to him preparatory to the making of the first out in the truss segment.

The $A_{16}$ signal is also provided as the first input to coincidence gate 496 in indexing and cutting operation programmer 351, to condition the programmer for subsequent manual operations. The sawyer's operations at this time consist of accurately placing the place of lumber against extended stop 132 and guide fence 152 and then depressing the clamp button 462. This operation causes the generation of the $S_1$ signal which resets the still lit next heard indicator in display panel 322, and also passes through conditioned coincidence gate 496 to generate the $I_{10}$ signal. This closes the release valve, and opens the pressure source valve in each of the clamps 154, 156 and 161, causing than to close and securely lock the lumber in position.

Since ring counter 470 is in the $A_{16}$ state at this time, a conditioning signal is provided to all of coincidence gates 538 through 542 in board width selection generator 336. As previously described, while the board width measuring clamp 156 is closing, a succession of signals is provided to advance 13 position ring counter 242 successively through the particular number of states which characterize the width of the particular board then in position on the saw table. After the piece of lumber to be cut is fully locked between all of the clamps and the guide fence 150, the $I_4$ signal is generated by coincidence gate 214, which provides a further conditioning input to coincidence gate 538 through 542, and also a conditioning input to incidence gate 498 in indexing and cutting operation programmer 351.

In addition to the $I_4$ and $A_{16}$ signals, one of OR gates 532 through 536 will be producing an output depending on whether the particular board to be cut is oversize, normal, or undersized. Thus, one of coincidence gates 538 through 542 will receive signals at all three inputs, and will provide an output to set one flip flops 544 through 540. Assuming for purposed of explanation that the particular board being cut is understood, and that it is a 2×8, it may be understood that the $M_1$, $M_2$, and $M_3$ states of counter 242 will have been activated in turn, and that OR gate 536 will receive an output (i.e. $M_3$, which activates coincidence gate 542 to set flip flop 540). Thus, the output of flip flop 548 conditions coincidence gates 556 and 562 for operation when the $I_{12}$ and $I_{11}$ signals respectively are later generated by the system.

As indicated, the $I_4$ signal also conditions coincidence gate 498, so that the $S_2$ signal generated by the depression of cutting switch 500 may pass therethrough. As may be understood, the operator may depress both clamp switch 462 and cutting switch 500 simultaneously, since the $I_4$ signal will not be present until the clamps are fully closed. Further, the operator may release switches 462 and 500 at any time in order to readjust the lumber, or for any other reason and operation of arm motor 282 and saw motor 307 will be prevented due to the absence of the safety switch signal, which operates as previously described to stop each of motors 282 and 307, as well as to disconnect the coincidence gate 672 in the stop motor circuits to prevent further operation thereof until both the clamp switch 462 and the cut switch 500 are again depressed.

Assuming, however, that the sawyer has properly adjusted the piece of lumber and has depressed the clamp and cutting switches, the signals $S_1$, $S_2$ and $I_4$ will all be present, and the indexer signal $I_{11}$ will be generated. All of the above mentioned meters are then conditioned by the safety switch signal and the $I_{11}$ signal is also provided to each of coincidence gates 558 through 562. Since the particular place of lumber was chosen, for exemplary purposes, to be undersized, coincidence gate 562 is conditioned by the output of flip flop 548, and the $I_{23}$ signal is provided to the series of gates 620 at the output of angle register 568, thereby causing its contents to be connected as the inputs to angle indexer 444.

After a sufficient period for the transferred information to stablize, the $I_{11}$ signal also passes through delay circuit 694 as the indexer start signal on lead 634 (see FIG. 17). Thus, the position of blade 168 is adjusted to the appropriate angle to make the first cut, i.e., the angle $90°-a_1$.

The $I_{11}$ signal also passes through OR gate 504 to reset flip flop 510 causing the then extended step 132 to be lowered. This causes no difficulties as far as positioning of the board is concerned, since the vertical and horizontal clamps will maintain the board in the previously established position required for cutting.

After a sufficient time to permit the complete retraction of stop 132, the $I_{11}$ signal passes through delay circuit 502 at which time the flip flop 510 is set causing the generation of the $I_{14}$ output. This conditions the series of coincidence gates 650. At the same time, the $I_{12}$ signal is provided to coincidence gates 52 through 556, whereby only gate 556, which was previously conditioned by the output of flip flop 548, is operated. This causes the generation of the $I_{20}$ signal which is passed to undersize dimension registers 574, 580, and 586, to select can of stops 106 or 132, and to set the location of stop carriage 53. In particular, coincidence gate 626 is activated and the proper combination of signals passes to the series of OR gate 542 and thence to translator 642 which selects one of coincidence gates 650, previously conditioned by the $I_{14}$ signal. The appropriate one of coincidence gates 650 sets one of flip flops 652, causing the extension of the stop against which the lumber is to be positioned for the next cut. Similarly, coincidence gates 632 and 638 are conditioned by the $I_{20}$ signal, and pass a pair of digital code series of words through OR gates 644 and 646 respectively to translator matrix 656, which provides the required information to motor control 658 to adjust the position of carriage 58, for the next cut. Thus, it may be seen that while the angle indexer 344 is establishing the angle of the saw blade for the cut $A_1$ (see FIG. 11c), coarse and fine length indexers 346 and 348 are establishing the distance $L_2$ at which the second cut will be made. Accordingly, it may be understood that the information read from tape 318 during the $A_5$ through $A_{15}$ states represents the angle $a_1$ and the length $L_2$.

As the angle and carriage stopping motors complete the required adjustments, signals are provided over leads 32 and 34 to coincidence gate 568 which receives as its third input the $I_{11}$ signal through delay circuit 506. After complete rebalancing, coincidence gate 500 provides the signal through differentiator 512 to set flip flop 514 and turn on blade motor 307. Similarly, a sufficient time later to permit the blade motor to reach its required speed, delay circuit 516 causes flip flop 520 to be set. This generates the $I_{16}$ signal to start motor 262. As arm 276 advances, the piece of lumber in cut at the required angle $a_1$ without any further action by the sawyer. However, should be release buttons 462 or 500, the safety switch signal causes both arm motor 282 and saw motor 307 to be stopped until the buttons are depressed again.

When arm 273 reaches substantially maximum forward position, micro-switch 310 is actuated, generating the $S_5$ signal which passes through OR gate 522 to reset flip flop 520. This reverses saw arm motor 282. After the arn has returned to its rest position, micro-switch 312 is actuated, generating the $S_6$ signal to block inhibit gate 523 and to turn off arm motor 282. At the same time, the $S_6$ signal passes through differentiator 516 to reset flip flop 514, thereby turning off blade motor 307. At this time, the cut as the angle $a_1$ is complete and the system reacts in the $A_{16}$ state, with one of stops 106 or 132 extended in the position required for the next cut.

Flip flops 544 through 540 in board width selection generator 336 remain in the conditions set during the $A_{16}$ state, since only a single measurement of a particular board is necessary. Thus, whichever series of registers (i.e., corresponding to oversized, normal, or undersized boards) was selected for the first cut, continue to be selected for all subsequent cuts until one of flip flops 544 through 546 is reset by the receipt of a $T_{17}$ (TEST BOARD) word.

The operator then releases the clamp switch 462, and the cut switch 500, and depresses the stop tape button 494 in order to read in the next block of information appearing on the tape. The stopping signal $S_3$ causes tape reader 316 to advance, and after the delay period of circuit 490, advances program sequencing ring 470 into the $A_{17}$ state. During the $A_{17}$ state, a signal on the tape will either signify that a double cut is to be made, that the other end of the board is to be cut, that the next board in the truss is to be cut, or that the truss is completed. As previously mentioned, the first two of the above identifications are really unnecessary, since the sawyer merely has to advance the piece of lumber to the previously extended next stop in order to prepare for the next cutting operation. Of course, as may be understood if a subsequent cut is unnecessary, no stop will rise during the previously described indexing operations and the NEXT BOARD or END OF TRUSS lights will be illustrated during $A_{17}$. However, assuming that the DOUBLE-DOUBLE configuration is to be cut, the translator matrix 466 will generate the $T_{18}$ signal (DOUBLE CUT) during ring counter state $A_{17}$ and the reading in of the information required for the angle $a_2$ as well as for length $L_3$ will begin.

The outputs of ring counter 479 corresponding to states $A_{17}$ through $A_{23}$ are all connected to OR gate 462 in tape stopping logic unit 398, in order to sequentially operate the tape reader to obtain the next word on the tape. Similarly, the tape stopping signal is returned through ring advancing control gate 474 to sequentially stop ring counter 470 through the states $A_{18}$ through $A_{29}$. Again, as in the case of the $A_{16}$ state, no $A_{29}$ signal is connected to OR gate 482, therefore the system rests in the $A_{29}$ state, but the $A_{29}$ is provided through OR gate 460 to illuminate the ready light in instruction panel 322.

At this time, the sawyer repeats all of the manual operations previously described, including the depression of the clamp switch 462 and cut switch 500, which causes the adjustment of the blade to angle $a_2$ and the setting of the distance $L_3$ for the next cut, as well as the actual cutting of the lumber. After the second cut, the system rests in the $A_{29}$ state, in the same manner as after the first cut.

In order to initiate the third cut, the clamp switch 462 and cutting switches 500 are released and tape switch 494 is again depressed. The $S_3$ signal causes the advancement of tape reader 316 and the transfer of program sequencing ring into the $A_{39}$ state. The word read in may be END OF TRUSS, NEXT BOARD or OTHER END, the latter, of course, being present in this case for the Double-Double cut. Signals corresponding to the $A_{30}$ through $A_{41}$ states pass through OR gate 432 and sequentially operate the tape reader and the program sequencing ring as previously described to read in the information for the angle $a_3$ and the length $L_4$. Following the receipt of the above information, the system rests in the $A_{42}$ state until the manual cutting operations take place, after which the system remains at rest as described above.

Upon a subsequent depression of the tape stopping button 494, the system switches into the $A_{43}$ state during which time it either receives the DOUBLE CUT, NEXT BOARD or END OF TRUSS words. Again assuming that the DOUBLE DOUBLE configuration is required, the word received is the double cut word, and the system is advanced on through the $A_{44} - A_{46}$ states during which the three alternative angle numbers are received and stored. As may be understood, there is no necessity to receive further length information, since the distance $L_4$ has already been established during the previous cut. Thus registers 570 – 586 arm not cleared or set since the $A_{42}$ signal inhibits gate 612 and blocks the clear signal $I_8$.

The final cut is then made as before, after which the system remains at rest in the $A_{45}$ state until the operator again depresses the tape stopping button 494.

Of course, the operator now knows that the particular board being cut is complete, but in order to determine whether the truss itself is also complete, it is necessary to advance the tape one further step, whereupon either the NEXT BOARD or END OF TRUSS word is present on the tape. The last depression of tape stopping button 494 causes program sequencing ring 470 to advance into the $A_{47}$ state, as would in the case upon receipt of the next board word at any other point in the sequence. If the truss is complete, the $T_{20}$ output is provided to reset flip flop 480, causing ring 470 to be locked in place until a subsequent next board word ($T_{17}$) is received. Thus, it may be seen that during any of the ring counter states following that in which a cut made, i.e. states $A_{17}$, $A_{30}$, $A_{43}$, and $A_{47}$, instruction words such as DOUBLE CUT, OTHER END OF BOARD, etc., may be received and will cause appropriate conditionally of this system to handle each of the possible segment configurations previously described. During the immediately following states, information defining the angle for the next cut is read in, as well as the length for the subsequent cut, if needed. The operator simply repositions the board against each stop as it extendss and pushes the buttons to start the cutting operations.

Thus there is provided a rapid and automatic cutting machine having great flexbility and accuracy.

While the invention has been described in terms of a particular embodiment, it should be recognized that considerable latitude exists as to construction within the scope of the invention. For example, as previously mentioned, the dence may be embodied in a two saw configuration having a first fired say and a second movable saw in which the blade angles of both are adjusted to effect simultaneous cutting at both ends of the piece of lumber.

Moreover, the concepts of this invention do not require the use of one or more radical arm saws, but could employ instead any angularly adjustable saw.

In addition, the detailed circuit embodiments shown are intended only to be exemplary, and to effectuate the concepts incorporated therein. Thus considerable variation in construction is possible, wherein different circuit configurations, as well as additional features, may be included. Input information need not be provided on a punched paper tape; a magnetic tape, and suitable tape reader may be readily substituted therefor. In like fashion, the use of punched cards may be substituted for the tape without departure from the scope of the invention.

Also, the above described sequence of operations and the corresponding order of the input information may be varied in the scope of the invention to permit adjustment of angles and distances differently than as described. Similarly, the use of variable values of the distance $L_1$, herein described as fixed, may be readily achieved within the scope of the invention.

Modifications in the mechanical structure, including variation in the position and actuation mechanisms of lumber steps 106 and 132, as well as in the configuration described for board width sensing clamp 156 are contemplated as being within the scope of this invention. The actrating mechanism for carriage 58, as well as that for positioning saw blade 168, is also contemplated as being subject to modification within the scope of the invention.

Finally, the degree of mechanisation achieved in the present embodiment may be increased or decreased to suit specific needs, all within the scope of the invention.

Therefore, it should be understood that the foregoing disclosure, while presented in terms of a preferred embodiment, is intended to cover all changes and modifications within the spirit and essential characteristics thereof; the scope of the invention being indicated by the appended claims rather than by the foregoing description, and all changes which come within the meaning and range of equivalency of the claims are intended to be embraced therein.

What is claimed is:

1. A cutting machine comprising a framework including a cutting surface comprised of a table adapted for receiving a wooden member, cutting means comprising a blade, first control means for providing a first motion to said blade to effect a cut on said wooden member, second control means for providing a second motion to said blade relative to said wooden member for engaging said blade with said wooden member; reference position means including a guide fence for supporting and aligning said workpiece in relation to said blade, a carriage mounted on said framework for movement therealong, a plurality of stops carried by said carriage and movable therewith along said cutting surface and parallel to said fence for establishing distances of cuts between said blade and said stops, each of said stops being movable from a first position spaced from said cutting surface into a second position providing an abutment for an end of said wooden member, means for moving said stops from said first position to said second position, means for positioning said carriage along said framework and thereby positioning said stops relative to said cutting surface to establish select cutting distances between said stops and said blade; means providing data in the form of electrical signals representing a predetermined distance between a selected stop and said blade, means responsive to said signals for controlling said positioning means to locate said carriage in a position whereby said selected stop is located at the predetermined distance from said blade, said signal responsive means including means for actuating the stop moving means to move said selected stop from a first to a second position, and means for clamping said wooden member to said table surface thereby holding said wooden member rigid during a cutting operation.

2. A machine according to claim 1 including means for actuating said clamping means, said signal responsive means being operable to retract the selected stop from engagement with said wooden member in response to actuation of said clamping means.

3. A machine according to claim 1 including means for moving said wooden member across said table for engagement against said guide fence.

4. A machine according to claim 1 wherein said clamping means applies a force to said wooden member in a direction opposite to the second direction of movement of said blade.

5. A machine according to claim 1 wherein said first control means includes a motor for rotating said blade, and wherein said second control means includes means for translating said blade while the same is being rotated to engage said blade with said wooden member.

6. A cutting machine as defined in claim 1 wherein said signal responsive means includes memory means for storing said electrical signals, said positioning means being operable in response to the pattern of signals in said memory means.

7. A cutting machine as defined in claim 6 wherein said data is provided in blocks and wherein said memory means includes individual memory elements, means for connecting each memory element in turn to said data source to store a particular portion of each data block, and means coupling said individual memory elements to said positioning means.

8. A cutting machine as defined in claim 6 wherein said positioning means includes means responsive to at least a portion of the signal pattern in said memory to control the position of said carriage relative to said framework.

9. A cutting machine as defined in claim 8 wherein said means for moving said carriage comprises a reversible motor operative in response to a portion of said signal pattern, a lead screw driven by said motor, and a follower attached to said movable carriage and adapted to cooperate with said lead screw for moving said carriage toward or away from the blade in accordance with the direction of rotation of the lead screw.

10. A cutting means as defined in claim 5 wherein said second control means comprises an arm for movably supporting said saw blade and blade motor, an arm motor, means driven by said arm motor to extend and retract said saw blade along said arm, and manual switch means to actuate said blade motor and said arm motor under control of an operator.

11. A cutting machine as defined in claim 1 wherein said signal responsive means comprises means for receiving signals corresponding to said predetermined distance between said selected stop and said blade, means for receiving information regarding the actual distance between said selected stop and said blade, means for comparing said actual distance and said predetermined distance and for providing a difference signal, means responsive to said difference signal to operate said positioning mechanism to reduce the difference between the actual and predetermined distances and to provide an indication when the actual distance equals the predetermined distance.

12. A cutting machine as defined in claim 1 including further signal responsive means for storing data representing identifying characteristics for selecting the wooden member, and means for displaying said identifying data in visible form.

13. A cutting machine comprising a framework including a cutting surface comprised of a table adapted for receiving a wooden member, cutting means comprising a blade, first control means for providing a first motion to said blade to effect a cut on said wooden member, second control means for providing a second motion to said blade relative to said wooden member for engaging said blade with said wooden member; reference position means including a guide fence for supporting and aligning said workpiece in relation to said blade, a carriage mounted on said framework for movement therealong, a stop carried by said carriage and movable therewith along said cutting surface and parallel to said fence for establishing a distance of cut between said blade and said stop, said stop being adapted to provide an abutment for an end of said wooden member, means for positioning said carriage along said framework and thereby positioning said stop relative to said cutting surface to establish select cutting distances between said stop and said blade; means providing data in the form of electrical signals representing a predetermined distance between said stop and said blade, means responsive to said signals for controlling said positioning means to locate said carriage in a position whereby said stop is located at the predetermined distance from said blade, and means for clamping said wooden member to said table thereby holding said wooden member rigid during a cutting operation.

* * * * *